(12) United States Patent
Hug

(10) Patent No.: US 10,104,145 B2
(45) Date of Patent: Oct. 16, 2018

(54) SYSTEM AND METHOD FOR CACHING DATA

(71) Applicant: Intel Corporation, Santa Clara, CA (US)

(72) Inventor: Joshua D. Hug, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 14/285,347

(22) Filed: May 22, 2014

(65) Prior Publication Data

US 2014/0258475 A1 Sep. 11, 2014

Related U.S. Application Data

(60) Division of application No. 11/242,339, filed on Oct. 3, 2005, now Pat. No. 8,996,420, which is a
(Continued)

(51) Int. Cl.
*H04L 29/06* (2006.01)
*H04N 7/173* (2011.01)
(Continued)

(52) U.S. Cl.
CPC ......... *H04L 65/601* (2013.01); *G06Q 20/123* (2013.01); *H04H 60/23* (2013.01);
(Continued)

(58) Field of Classification Search
CPC .. H04L 12/189; H04L 12/241; H04L 12/2874
(Continued)

(56) References Cited

U.S. PATENT DOCUMENTS

| 5,440,334 A | 8/1995 | Walters et al. |
|---|---|---|
| 5,481,610 A | 1/1996 | Doiron et al. |

(Continued)

FOREIGN PATENT DOCUMENTS

| GB | 2405718 A | 3/2005 |
|---|---|---|
| JP | 08-008851 B | 1/1996 |

(Continued)

OTHER PUBLICATIONS

Office Action received for European Patent Office Application No. 06816048.0, dated Nov. 19, 2014, 5 pages.
(Continued)

*Primary Examiner* — Abhishek Vyas
*Assistant Examiner* — Murali K Dega
(74) *Attorney, Agent, or Firm* — Christopher K. Gagne

(57) ABSTRACT

A method of obtaining radio content from a remote electronic device for a user electronic device includes transmitting a request for radio media content to a first remote electronic device via a network. Radio media content that includes a plurality of media data files is received via the network. The received plurality of media data files are stored in a storage device of the user electronic device. A radio playlist that defines a rendering sequence for the plurality of media data files is requested. In response to the request for the radio playlist, the radio playlist is received. The radio playlist is processed in the user electronic device to enable the stored plurality of media data files to be rendered on the user electronic device in accordance with the radio playlist.

12 Claims, 23 Drawing Sheets

Related U.S. Application Data continuation-in-part of application No. 10/719,981, filed on Nov. 21, 2003, now Pat. No. 7,882,034.

(51) Int. Cl.

| | | |
|---|---|---|
| *H04N 21/258* | (2011.01) | |
| *H04N 21/41* | (2011.01) | |
| *H04N 21/432* | (2011.01) | |
| *H04N 21/442* | (2011.01) | |
| *H04N 21/4627* | (2011.01) | |
| *H04N 21/472* | (2011.01) | |
| *H04N 21/61* | (2011.01) | |
| *H04N 21/6334* | (2011.01) | |
| *G06Q 20/12* | (2012.01) | |
| *H04L 29/08* | (2006.01) | |
| *H04H 60/23* | (2008.01) | |
| *H04H 60/63* | (2008.01) | |

(52) U.S. Cl.
CPC ............ *H04H 60/63* (2013.01); *H04L 65/60* (2013.01); *H04L 67/2842* (2013.01); *H04N 7/173* (2013.01); *H04N 7/17309* (2013.01); *H04N 21/25816* (2013.01); *H04N 21/4108* (2013.01); *H04N 21/4325* (2013.01); *H04N 21/44204* (2013.01); *H04N 21/4627* (2013.01); *H04N 21/472* (2013.01); *H04N 21/6125* (2013.01); *H04N 21/6334* (2013.01)

(58) Field of Classification Search
USPC ............................................ 709/219; 705/52
See application file for complete search history.

(56) References Cited

U.S. PATENT DOCUMENTS

| | | | |
|---|---|---|---|
| 5,586,264 | A | 12/1996 | Belknap et al. |
| 5,608,171 | A | 3/1997 | Hunter et al. |
| 5,629,980 | A | 5/1997 | Stefik et al. |
| 5,655,144 | A | 8/1997 | Milne et al. |
| 5,708,422 | A | 1/1998 | Blonder et al. |
| 5,708,709 | A | 1/1998 | Rose |
| 5,745,902 | A | 4/1998 | Miller et al. |
| 5,819,160 | A | 10/1998 | Foladare et al. |
| 5,857,020 | A | 1/1999 | Peterson, Jr. |
| 5,892,900 | A | 4/1999 | Ginter |
| 6,009,401 | A | 12/1999 | Horstmann |
| 6,151,634 | A | 11/2000 | Glaser et al. |
| 6,189,146 | B1 | 2/2001 | Misra et al. |
| 6,219,652 | B1 | 4/2001 | Carter et al. |
| 6,226,618 | B1 | 5/2001 | Downs et al. |
| 6,236,971 | B1 | 5/2001 | Stefik et al. |
| 6,373,948 | B1 | 4/2002 | Wool |
| 6,434,621 | B1 | 8/2002 | Pezzillo et al. |
| 6,484,182 | B1 | 11/2002 | Dunphy et al. |
| 6,560,651 | B2 | 5/2003 | Katz et al. |
| 6,597,961 | B1 | 7/2003 | Cooke |
| 6,662,231 | B1 | 12/2003 | Drosset |
| 6,842,906 | B1 | 1/2005 | Bowman-Amuah |
| 6,853,728 | B1 | 2/2005 | Kahn et al. |
| 6,920,567 | B1 | 7/2005 | Doherty et al. |
| 6,961,858 | B2 | 11/2005 | Fransdonk |
| 7,010,689 | B1 | 3/2006 | Matyas et al. |
| 7,020,635 | B1 | 3/2006 | Hamilton et al. |
| 7,069,347 | B1 | 6/2006 | Kolokowsky |
| 7,073,063 | B2 | 7/2006 | Peinado |
| 7,080,049 | B2 | 7/2006 | Truitt et al. |
| 7,090,128 | B2 | 8/2006 | Farley et al. |
| 7,107,462 | B2 | 9/2006 | Fransdonk |
| 7,150,045 | B2 | 12/2006 | Koelle et al. |
| 7,203,966 | B2 | 4/2007 | Abburi et al. |
| 7,272,859 | B2 | 9/2007 | Kuriya et al. |
| 7,318,236 | B2 | 1/2008 | DeMello et al. |
| 7,328,243 | B2 | 2/2008 | Yeager et al. |
| 7,395,244 | B1 | 7/2008 | Kingsford |
| 7,406,436 | B1 | 7/2008 | Reisman |
| 7,523,071 | B2 | 4/2009 | Fox et al. |
| 7,587,502 | B2 | 9/2009 | Crawford et al. |
| 7,711,586 | B2 | 5/2010 | Aggarwal et al. |
| 7,882,034 | B2 | 2/2011 | Hug et al. |
| 7,987,491 | B2 | 7/2011 | Reisman |
| 8,185,475 | B2 | 5/2012 | Hug |
| 8,498,942 | B2 | 7/2013 | Hug |
| 8,738,537 | B2 | 5/2014 | Hug |
| 2001/0025256 | A1 | 9/2001 | Oliphant et al. |
| 2001/0030667 | A1 | 10/2001 | Kelts |
| 2001/0039614 | A1 | 11/2001 | Hellberg et al. |
| 2001/0044851 | A1 | 11/2001 | Rothman |
| 2002/0002039 | A1 | 1/2002 | Qureshey et al. |
| 2002/0012443 | A1 | 1/2002 | Rhoads et al. |
| 2002/0013784 | A1 | 1/2002 | Swanson |
| 2002/0023010 | A1 | 2/2002 | Rittmaster et al. |
| 2002/0049717 | A1 | 4/2002 | Routtenberg et al. |
| 2002/0059499 | A1 | 5/2002 | Hudson |
| 2002/0108049 | A1 | 8/2002 | Xu et al. |
| 2002/0157034 | A1 | 10/2002 | Sagar |
| 2002/0188746 | A1 | 12/2002 | Drosset et al. |
| 2002/0198846 | A1 | 12/2002 | Lao |
| 2003/0018582 | A1 | 1/2003 | Yaacovi |
| 2003/0028395 | A1 | 2/2003 | Rodgers et al. |
| 2003/0028889 | A1 | 2/2003 | McCoskey |
| 2003/0097655 | A1 | 5/2003 | Novak |
| 2003/0115069 | A1 | 6/2003 | Pence et al. |
| 2003/0149975 | A1 | 8/2003 | Eldering |
| 2003/0163684 | A1 | 8/2003 | Fransdonk |
| 2003/0167318 | A1 | 9/2003 | Robbin et al. |
| 2003/0182315 | A1 | 9/2003 | Plastina et al. |
| 2003/0189879 | A1 | 10/2003 | Ishii et al. |
| 2003/0236905 | A1 | 12/2003 | Choi et al. |
| 2004/0003270 | A1 | 1/2004 | Bourne et al. |
| 2004/0116088 | A1 | 6/2004 | Ellis et al. |
| 2004/0139312 | A1 | 7/2004 | Medvinsky |
| 2004/0181490 | A1 | 9/2004 | Gordon et al. |
| 2004/0199534 | A1 | 10/2004 | Juszkiewicz |
| 2004/0205811 | A1 | 10/2004 | Grandy |
| 2004/0220881 | A1 | 11/2004 | Powell |
| 2004/0260716 | A1 | 12/2004 | Sugiura |
| 2005/0010531 | A1 | 1/2005 | Kushalnagar et al. |
| 2005/0022019 | A1 | 1/2005 | Medvinsky et al. |
| 2005/0091107 | A1 | 4/2005 | Blum |
| 2005/0094516 | A1 | 5/2005 | Morimoto et al. |
| 2005/0114374 | A1 | 5/2005 | Juszkiewicz |
| 2005/0125222 | A1 | 6/2005 | Brown et al. |
| 2005/0131731 | A1 | 6/2005 | Brydon et al. |
| 2005/0203959 | A1 | 9/2005 | Muller et al. |
| 2006/0085349 | A1 | 4/2006 | Hug |
| 2006/0259429 | A1 | 11/2006 | Hug |
| 2006/0259436 | A1 | 11/2006 | Hug |
| 2006/0265329 | A1 | 11/2006 | Hug |
| 2007/0033295 | A1 | 2/2007 | Marriott |
| 2007/0130589 | A1 | 6/2007 | Davis et al. |
| 2013/0305052 | A1 | 11/2013 | Hug |
| 2016/0132666 | A1 | 5/2016 | Hug |

FOREIGN PATENT DOCUMENTS

| | | |
|---|---|---|
| JP | 10-190594 A | 7/1998 |
| JP | 2002-325221 A | 11/2002 |
| JP | 2004-194271 A | 7/2004 |
| WO | 03/038704 A1 | 5/2003 |
| WO | 2003/058410 A1 | 7/2003 |
| WO | 2005/052381 A1 | 6/2005 |
| WO | 2005/052901 A2 | 6/2005 |
| WO | 2005/052901 A3 | 12/2005 |
| WO | 2007/041517 A2 | 4/2007 |
| WO | 2007/041567 A2 | 4/2007 |
| WO | 2007/041567 A3 | 4/2007 |
| WO | 2007/041609 A2 | 4/2007 |
| WO | 2007/078395 A2 | 7/2007 |
| WO | 2007/078396 A2 | 7/2007 |
| WO | 2007/078397 A2 | 7/2007 |
| WO | 2007/041609 A3 | 10/2007 |
| WO | 2007/078396 A3 | 10/2007 |

(56) References Cited

FOREIGN PATENT DOCUMENTS

| | | | |
|---|---|---|---|
| WO | 2007/078395 A3 | 11/2007 | |
| WO | 2007/041517 A3 | 12/2008 | |
| WO | 2007/078397 A3 | 5/2009 | |

OTHER PUBLICATIONS

Corrected Notice of Allowability for U.S. Appl. No. 11/242,339, dated Feb. 20, 2015, 7 pages.
Office Action Received for Korean Patent Application No. 10-2008-7010636, dated Jul. 25, 2013, 3 pages of Korean Office Action only.
Office Action Received for Korean Patent Application No. 10-2008-7010636, dated Nov. 22, 2013, 3 pages of Korean Office Action only.
Office Action received for Korean Patent Application No. 10-2008-7010636, dated Sep. 30, 2013, 3 pages of Korean Office Action only.
Office Action Received for Korean Patent Application No. 10-2008-7010636, dated Feb. 18, 2013, 4 pages of Korean Office Action only.
Notice of Allowance received for Korean Patent Application No. 10-2008-7010637, dated Oct. 8, 2013, 5 pages of Korean Notice of Allowance only.
Office Action received for Korean Patent Application No. 10-2008-7010637, dated Apr. 12, 2013, 3 pages of Korean Office Action only.
Notice of Allowance received for Korean Patent Application No. 10-2013-7015120 , dated Mar. 14, 2014, 5 pages of Korean Notice of Allowance only.
Office Action received for Japanese Patent Application No. 2012-186743, dated Jul. 30, 2013, 4 pages of English Translation and 4 Pages of Japanese Office Action.
Office Action received for Japanese Patent Application No. 2012-186743, dated Feb. 18, 2014, 4 pages of English Translation and 2 Pages of Japanese Office Action.
Office Action received for Japanese Patent Application No. 2012-275454, dated Feb. 18, 2014, 7 pages of English Translation and 4 Pages of Japanese Office Action.
Office Action Received for European Patent Application No. 06816048.0, dated May 13, 2013, 5 pages of Office Action only.
Abrams, et al., "Controlling Primary and Secondary Access to Digital Information,", The MITRE Corporation Article, Oct. 16-18, 2000, 11 pages.
Breakthrough in Digital Security Spurs PH ISH to Offer New Year's Eve Concert Tracks Via Internet, Business Wire, Dec. 30, 1999, 3 pages.
Challenge, Chambers 21st Century Dictionary, London, Chambers Harrap, 2001, Credo Reference Jul. 25, 2009, 2 pages.
Chellenge, Render, Chambers 21st Century Dictionary, London: Champers Harrap, 2001, Credo reference [online] Jul. 25, 2009, 5 pages.
Belt, David, "Cable 3.0: DRM for Linear Content Delivery", Cable Labs, Dec. 2010, 20 pages.
DeviceSecurity:1 Service Template, UPNP Device Architecture 1.0, Standardized DCP, Nov. 17, 2003, 66 pages.
Menezes, et al., "Handbook of Applied Cryptography", CRC Press, Chapter 1, 1997, 18 pages.
Merriam-Webster, Collegiate Dictionary 1oth Ed., Merriam-Webster, Inc., Springfield, MA, 1993, 2 pages.
An Introduction to Cryptography, PGP, Version 7 .0, Network Associates, Inc., 1990-2000, 89 pages.
Subscription, Collins English Dictionary. London: Collins, 2000. Credo Reference [online] Jul. 24, 2009, 3 Pages.
The Napster Dilemma Solved: Free Doesn't Need to Mean Piracy, Viatech Technologies, In., Market Wire, Aug. 1, 2000, 2 pages.
ViaTech Technologies, Ind., retrieved from htlp://web.archive.org/web/2003118151847/http:l/viatechinc.com, Nov. 18, 2003, 1 page.
White, Ron, "How Computers Work", Millennium Edition, Que Corporation, 1999, 3 Pages.
International Preliminary Report on Patentability and Written Opinion received for PCT Patent Application No. PCT/US2004/039371, dated May 22, 2006, 4 pages.
International Search Report and Written Opinion received for PCT Patent Application No. PCT/US2004/039371, dated Oct. 24, 2005, 4 pages.
International Preliminary Report on Patentability and Written Opinion received for PCT Patent Application No. PCT/US2006/042142, dated Jul. 10, 2008, 6 pages.
International Search Report and Written Opinion received for PCT Patent Application No. PCT/US2006/042142, dated Aug. 29, 2007, 1 pages.
International Preliminary Report on Patentability and Written Opinion received for PCT Patent Application No. PCT/US2006/038596, dated Apr. 8, 2008, 6 pages.
International Search Report and Written Opinion received for PCT Patent Application No. PCT/US2006/038596, dated Aug. 16, 2007, 6 pages.
International Preliminary Report on Patentability and Written Opinion received for PCT Patent Application No. PCT/US2006/042143, dated Jul. 1, 2008, 4 pages.
International Search Report and Written Opinion received for PCT Patent Application No. PCT/US2006/042143, dated Jul. 31, 2007, 4 pages.
International Preliminary Report on Patentability and Written Opinion received for PCT Patent Application No. PCT/US2006/038496, dated Nov. 4, 2008, 4 pages.
International Search Report and Written Opinion received for PCT Patent Application No. PCT/US2006/038496, dated Jul. 3, 2008, 4 pages.
International Preliminary Report on Patentability and Written Opinion received for PCT Patent Application No. PCT/US2006/038708, dated Apr. 8, 2008, 5 pages.
International Search Report and Written Opinion received for PCT Patent Application No. PCT/US2006/038708, dated Aug. 17, 2007, 5 pages.
International Preliminary Report on Patentability and Written Opinion received for PCT Patent Application No. PCT/US2006/042144, dated Mar. 17, 2009, 5 pages.
International Search Report and Written Opinion received for PCT Patent Application No. PCT/US2006/042144, dated Jan. 22, 2008, 5 pages.
Final Office Action received for U.S. Appl. No. 10/719,981, dated Feb. 9, 2009, 23 pages.
Final Office Action received for U.S. Appl. No. 10/719,981, dated Jun. 13, 2008, 21 pages.
Non-Final Office Action received for U.S. Appl. No. 10/719,981, dated Mar. 15, 2010, 29 pages.
Non-Final Office Action received for U.S. Appl. No. 10/719,981, dated Sep. 27, 2007, 17 pages.
Notice of Allowance received for U.S. Appl. No. 10/719,981, dated Dec. 10, 2010, 8 pages.
Response to Office Action filed for U.S. Appl. No. 10/719,981, dated Aug. 7, 2009, 18 pages.
Response to Office Action filed for U.S. Appl. No. 10/719,981, dated Aug. 11, 2010, 15 pages.
Response to Office Action filed for U.S. Appl. No. 10/719,981, dated Mar. 27, 2008, 10 pages.
Response to Office Action filed for U.S. Appl. No. 10/719,981, dated Nov. 13, 2008, 10 pages.
Final Office Action received for U.S. Appl. No. 11/242,223, dated Dec. 1, 2009, 11 pages.
Non-Final Office Action received for U.S. Appl. No. 11/242,223, dated Mar. 4, 2009, 9 pages.
Notice of Allowance received for U.S. Appl. No. 11/242,223, dated Apr. 10, 2012, 12 pages.
Response to Office Action filed for U.S. Appl. No. 11/242,223, dated Aug. 4, 2009, 13 pages.
Response to Office Action filed for U.S. Appl. No. 11/242,223, dated Mar. 1, 2010, 17 pages.
Restriction Requirement received for U.S. Appl. No. 11/242,223, dated Nov. 28, 2008, 11 pages.
Final Office Action received for U.S. Appl. No. 11/242,339, dated Oct. 26, 2009, 21 pages.
Non-Final Office Action received for U.S. Appl. No. 11/242,339, dated Mar. 13, 2012, 15 pages.

(56) References Cited

OTHER PUBLICATIONS

Non-Final Office Action received for U.S. Appl. No. 11/242,339, dated Sep. 16, 2008, 14 pages.
Notice of Allowance received for U.S. Appl. No. 11/242,339, dated Apr. 11, 2014, 10 pages.
Notice of Allowance received for U.S. Appl. No. 11/242,339, dated May 27, 2014, 9 pages.
Office Action received for U.S. Appl. No. 11/242,339, dated Oct. 24, 2013, 14 pages.
Response to Office Action filed for U.S. Appl. No. 11/242,339, dated Dec. 27, 2013, 14 pages.
Response to Office Action filed for U.S. Appl. No. 11/242,339, dated Feb. 17, 2009, 23 pages.
Response to Office Action filed for U.S. Appl. No. 11/242,339, dated Feb. 26, 2010, 14 pages.
Response to Office Action filed for U.S. Appl. No. 11/242,339, dated Jun. 12, 2012, 12 pages.
Restriction Requirement received for U.S. Appl. No. 11/242,339, dated Jun. 10, 2008, 8 pages.
Corrected Notice of Allowance received for U.S. Appl. No. 11/242,341, dated Sep. 22, 2013, 17 pages.
Final Office Action received for U.S. Appl. No. 11/242,341, dated Mar. 19, 2009, 14 pages.
Final Office Action received for U.S. Appl. No. 11/242,341, dated Sep. 27, 2010, 8 pages.
Non-Final Office Action received for U.S. Appl. No. 11/242,341, dated Sep. 15, 2009, 15 pages.
Non-Final Office Action received for U.S. Appl. No. 11/242,341 dated Sep. 26, 2008, 16 pages.
Notice of Allowance received for U.S. Appl. No. 11/242,341 , dated Sep. 6, 2013, 16 pages.
Notice of Allowance received for U.S. Appl. No. 11/242,341, dated Nov. 25, 2013, 11 pages.
Response to Office Action filed for U.S. Appl. No. 11/242,341, dated Dec. 24, 2008, 12 pages.
Response to Office Action filed for U.S. Appl. No. 11/242,341, dated Jan. 27, 2011, 8 pages.
Response to Office Action filed for U.S. Appl. No. 11/242,341, dated Jun. 11, 2009, 21 pages.
Response to Office Action filed for U.S. Appl. No. 11/242,341, dated Mar. 15, 2010, 15 pages.
Final Office Action received for U.S. Appl. No. 11/322,314, dated Jun. 9, 2010, 11 pages.
Final Office Action received for U.S. Appl. No. 11/322,314, dated Mar. 16, 2009, 12 pages.
Final Office Action received for U.S. Appl. No. 11/322,314, dated Mar. 28, 2013, 13 pages.
Final Office Action received for U.S. Appl. No. 11/322,314, dated Oct. 27, 2011, 13 pages.
Non Final Office Action received for U.S. Appl. No. 11/322,314, dated Aug. 2, 2012, 14 pages.
Non Final Office Action received for U.S. Appl. No. 11/322,314, dated May 11, 2011, 14 pages.
Non Final Office Action received for U.S. Appl. No. 11/322,314, dated Sep. 15, 2008, 11 pages.
Non Final Office Action received for U.S. Appl. No. 11/322,314, dated Sep. 2, 2009, 10 pages.
Response to Office Action filed for U.S. Appl. No. 11/322,314, dated Aug. 9, 2010, 15 pages.
Response to Office Action filed for U.S. Appl. No. 11/322,314, dated Aug. 11, 2011, 15 pages.
Response to Office Action filed for U.S. Appl. No. 11/322,314, dated Dec. 15, 2008, 16 pages.
Response to Office Action filed for U.S. Appl. No. 11/322,314, dated Feb. 24, 2012, 20 pages.
Response to Office Action filed for U.S. Appl. No. 11/322,314, dated Jun. 21, 2013, 12 pages.
Response to Office Action filed for U.S. Appl. No. 11/322,314, dated May 18, 2009, 23 pages.
Response to Office Action filed for U.S. Appl. No. 11/322,314, dated Nov. 24, 2009, 16 pages.
Response to Office Action filed for U.S. Appl. No. 11/322,314, dated Nov. 30, 2012, 16 pages.
Final Office Action received for U.S. Appl. No. 11/322,717, dated Aug. 3, 2009, 14 pages.
Final Office Action received for U.S. Appl. No. 11/322,717, dated May 22, 2013, 20 pages.
Final Office Action received for U.S. Appl. No. 11/322,717, dated Oct. 26, 2010, 19 pages.
Non-Final Office Action received for U.S. Appl. No. 11/322,717, dated Apr. 13, 2010, 15 pages.
Non-Final Office Action received for U.S. Appl. No. 11/322,717, dated Jan. 23, 2009, 11 pages.
Non-Final Office Action received for U.S. Appl. No. 11/322,717, dated Mar. 29, 2012, 23 pages.
Office Action received for U.S. Appl. No. 11/322,717, dated Mar. 28, 2014, 20 pages.
Response to Office Action filed for U.S. Appl. No. 11/322,717, dated Apr. 23, 2009, 13 pages.
Response to Office Action filed for U.S. Appl. No. 11/322,717, dated Aug. 21, 2013, 15 pages.
Response to Office Action filed for U.S. Appl. No. 11/322,717, dated Feb. 3, 2010, 18 pages.
Response to Office Action filed for U.S. Appl. No. 11/322,717, dated Feb. 28, 2011, 17 pages.
Response to Office Action filed for U.S. Appl. No. 11/322,717, dated Jul. 12, 2010, 16 pages.
Response to Office Action filed for U.S. Appl. No. 11/322,717, dated Jun. 6, 2014, 9 pages.
Response to Office Action filed for U.S. Appl. No. 11/322,717, dated Jun. 29, 2012, 16 pages.
Final Office Action received for U.S. Appl. No. 11/322,720, dated Apr. 15, 2010, 9 pages.
Final Office Action received for U.S. Appl. No. 11/322,720, dated Aug. 26, 2009, 11 pages.
Final Office Action received for U.S. Appl. No. 11/322,720, dated Apr. 9, 2014, 14 pages.
Non-Final Office Action received for U.S. Appl. No. 11/322,720, dated Dec. 6, 2012, 19 pages.
Non-Final Office Action received for U.S. Appl. No. 11/322,720, dated Mar. 4, 2009, 13 pages.
Response to Office Action filed for U.S. Appl. No. 11/322,720, dated Apr. 5, 2013, 24 pages.
Response to Office Action filed for U.S. Appl. No. 11/322,720, dated Jul. 15, 2010, 13 pages.
Response to Office Action filed for U.S. Appl. No. 11/322,720, dated Jun. 4, 2009, 20 pages.
Response to Office Action filed for U.S. Appl. No. 11/322,720, dated May 8, 2014, 13 pages.
Response to Office Action filed for U.S. Appl. No. 11/322,720, dated Oct. 26, 2009, 18 pages.
Non-Final Office Action received for U.S. Appl. No. 13/452,611, dated Nov. 19, 2012, 19 pages.
Notice of Allowance received for U.S. Appl. No. 13/452,611, dated Apr. 11, 2013, 16 pages.
Response to Office Action filed for U.S. Appl. No. 13/452,611, dated Feb. 19, 2013, 13 pages.
Restriction Requirement received for U.S. Appl. No. 13/452,611, dated Oct. 19, 2012, 6 pages.
Response to Restriction Requirement received for U.S. Appl. No. 13/452,611, filed Oct. 22, 2012, 6 pages.
Response to Restriction Requirement received for U.S. Appl. No. 11/242,223, filed Dec. 29, 2008, 13 pages.
Response to Restriction Requirement received for U.S. Appl. No. 11/242,339, filed Jul. 10, 2008, 3 pages.
Communication dated Aug. 3, 2016 in European Patent Application No. 16169543.2, enclosing Extended European Search Report (9 pages).
Communication pursuant to Rule 69 EPC and Invitation pursuant to Rule 70a(1) dated Oct. 10, 2016 in European Patent Application No. 16169543.2, 2 pages.

(56) References Cited

OTHER PUBLICATIONS

Office Action dated Sep. 1, 2016 in U.S. Appl. No. 14/285,347 and related attachments (38 pages).
Office Action dated Sep. 1, 2016 in U.S. Appl. No. 14/286,649 and related attachments (38 pages).
Office Action dated Sep. 14, 2016 in U.S. Appl. No. 14/288,226 and related attachments (38 pages).
Summons to Attend Oral Proceeding dated Nov. 27, 2016 in EP Application 06816046.0 and related attachments.
Office Action dated Feb. 9, 2017 in U.S. Appl. No. 14/285,347 and related attachments.
Office Action dated Feb. 3, 2017 in U.S. Appl. No. 14/286,649 and related attachments.
Office Action dated Feb. 9, 2017 in U.S. Appl. No. 14/288,226 and related attachments.
Office Action dated Jun. 21, 2017 in U.S. Appl. No. 14/288,226 and related attachments.
Office Action dated May 19, 2017 in U.S. Appl. No. 14/285,347 and related attachments.
Office Action dated Jun. 20, 2017 in U.S. Appl. No. 14/286,649 and related attachments.
Extended European Search Report received for European Patent Office Application No. 14180019.3, dated Jan. 20, 2015, 8 pages.
Office Action dated Nov. 30, 2017 in U.S. Appl. No. 14/288,226, and related attachments.
Office Action dated Nov. 30, 2017 in U.S. Appl. No. 14/286,649, and related attachments.
Office Action dated Jun. 11, 2018 in European Patent Application No. 14180019.3.
Notice of Allowance dated Apr. 20, 2018 in U.S. Appl. No. 14/286,649, and related attachments.
Notice of Allowance dated Apr. 26, 2018 in U.S. Appl. No. 14/288,226, and related attachments.
Notice of Allowance dated Jun. 14, 2018 in U.S. Appl. No. 14/285,347, and related attachments.

SYSTEM AND METHOD FOR CACHING DATA

RELATED APPLICATIONS

This application is a divisional of prior co-pending U.S. patent application Ser. No. 11/242,339 filed 3 Oct. 2005, which is a continuation-in-part of prior U.S. patent application Ser. No. 10/719,981 filed 21 Nov. 2003. Each of these prior U.S. Patent Applications is hereby incorporated herein by reference in its entirety.

TECHNICAL FIELD

This invention relates to media content caching and, more particularly, to media content caching on a personal media device.

BACKGROUND

Media distribution systems (e.g., the Rhapsody™ and Rhapsody-to-Go™ services offered by RealNetworks™ of Seattle, Wash.) distribute media content to a client electronic device (e.g., an MP3 player) from a media server. A media distribution system may distribute media content by allowing a user to download media data files and/or receive and process media data streams.

Media distribution systems may allow a user to listen to radio media content, such that individual media tracks are streamed via unicast or multicast to the user (in a fashion similar to that of a traditional radio station). Typically, the tracks included within the radio media content (and the order in which the tracks are rendered by the user or streamed to the user) are often governed by various laws and organizations, such as The Digital Millennium Copyright Act (i.e., the DMCA), the ASCAP (i.e., the American Society of Composers, Authors, and Publishers) policies, and the BMI (i.e., Broadcast Music, Inc.) policies. Further provisions under the copyright act may subject the user and/or distributor of the media content to increased royalties if the tracks are provided to the user without restrictions required by such laws.

One way to provide tracks to users while still complying with DMCA restrictions is described in U.S. Pat. No. 6,611,813. These and other methods prevent skipping of music in a playlist to ensure compliance with the DMCA, but do not provide for using a server generated radio station playlist when a device is un-tethered from a network.

SUMMARY OF DISCLOSURE

In a first implementation, a method of obtaining radio content from a remote electronic device for a user electronic device includes transmitting a request for radio media content to a first remote electronic device via a network. Radio media content that includes a plurality of media data files is received via the network. The received plurality of media data files are stored in a storage device of the user electronic device. A radio playlist that defines a rendering sequence for the plurality of media data files is requested. In response to the request for the radio playlist, the radio playlist is received. The radio playlist is processed in the user electronic device to enable the stored plurality of media data files to be rendered on the user electronic device in accordance with the radio playlist.

BRIEF DESCRIPTION OF THE DRAWINGS

FIG. 17a is a diagrammatic view of the storage device, radio playlist and modified seed content list of FIG. 16a;

DETAILED DESCRIPTION OF THE PREFERRED EMBODIMENTS

Figure 1:
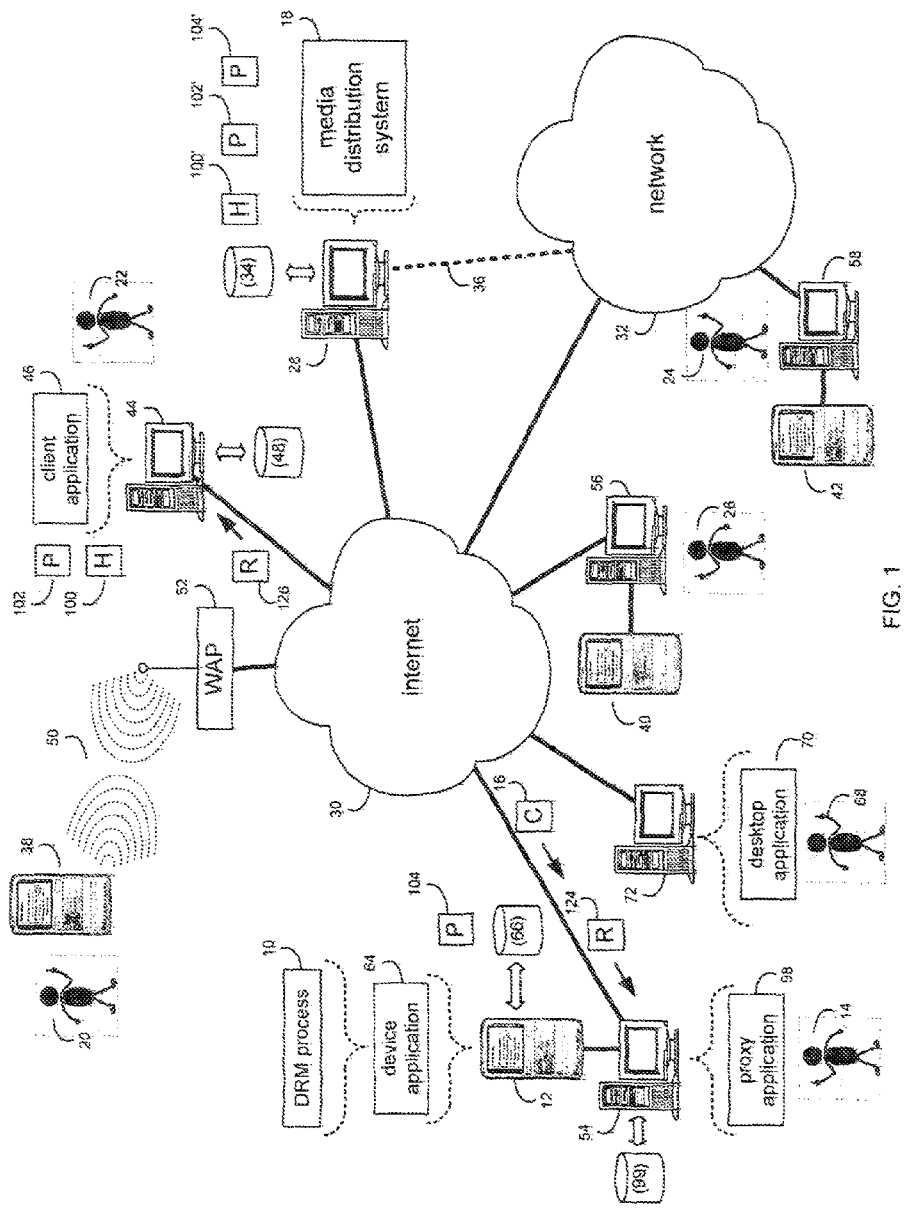
FIG. 1 is a diagrammatic view of a DRM process, a media distribution system, a client application, a proxy application, a device application, and a personal media device coupled to a distributed computing network.

System Overview:

Referring to FIG. 1, there is shown a DRM (i.e., digital rights management) process 10 that may be resident on and executed by personal media device 12. As will be discussed below in greater detail, DRM process 10 allows a user (e.g., user 14) of personal media device 12 to manage media content 16 resident on personal media device 12. Examples of personal media device 12 include a laptop/notebook computer, a PDA (i.e., personal digital assistant), a cellular telephone, a portable media player (e.g., an MP3 player), a pager, a wireless email device (e.g., a Blackberry™ device), and/or a portable gaming device (e.g., a Playstation™ Portable), for example. Personal media device 12 typically receives media content 16 from media distribution system 18.

As will be discussed below in greater detail, examples of the format of the media content 16 received from media distribution system 18 may include: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when media content 16 is streamed from e.g., computer 28 (i.e., which may include, but is not limited to, a server computer, a desktop computer, a laptop computer, a personal digital assistant, or a series of servers, for example) to personal media device 12, a copy of the media content 16 is not permanently retained on personal media device 12. In addition to media distribution system 18, media content 16 may be obtained from other sources, examples of which may include but are not limited to files ripped from music compact discs.

Examples of the types of media content 16 distributed by media distribution system 18 include: audio files (examples of which may include but are not limited to music files, audio news broadcasts, audio sports broadcasts, and audio recordings of books, for example); video files (examples of which may include but are not limited to video footage that does not include sound, for example); audio/video files (examples of which may include but are not limited to a/v news broadcasts, a/v sports broadcasts, feature-length movies and movie clips, music videos, and episodes of television shows, for example); and multimedia content (examples of which may include but are not limited to interactive presentations and slideshows, for example).

Media distribution system 18 typically provides media data streams and/or media data files to a plurality of users (e.g., users 14, 20, 22, 24, 26). Examples of such a media distribution system 18 include the Rhapsody™ service and Rhapsody-To-Go™ service offered by RealNetworks™ of Seattle, Wash. Prior to transmission, media distribution system 18 may encode the media data streams and/or media data files into e.g., MP3 (i.e., Motion Picture Experts Group Audio Layer 3) format, AAC (i.e., Advanced Audio Coding) format, RealAudio™ format, Quicktime™ format, and AVI (i.e., Audio Video Interleave) format, for example. Upon receipt, the streams/files may be decoded (using the appropriate decoder) and rendered.

Media distribution system 18 is typically a server application that resides on and is executed by computer 28 (e.g., a server computer) that is connected to network 30 (e.g., the Internet). Computer 28 may be a web server (or series of many connected servers) running a network operating system, examples of which may include but are not limited to Microsoft Windows 2000 Server™, Novell Netware™, or Redhat Linux™.

Typically, computer 28 also executes a web server application, examples of which may include but are not limited to Microsoft IIS™, Novell Webserver™, or Apache Webserver™, that allows for HTTP (i.e., HyperText Transfer Protocol) access to computer 28 via network 30. Network 30 may be connected to one or more secondary networks (e.g., network 32), such as: a local area network; a wide area network; or an intranet, for example.

The instruction sets and subroutines of media distribution system 18, which are typically stored on a storage device 34 coupled to computer 28, are executed by one or more processors (not shown) and one or more memory architectures (not shown) incorporated into computer 28. Storage device 34 may include but are not limited to a hard disk drive, a tape drive, an optical drive, a RAID array, a random access memory (RAM), or a read-only memory (ROM).

Users 14, 20, 22, 24, 26 may access media distribution system 18 directly through network 30 or through secondary network 32. Further, computer 28 (i.e., the computer that executes media distribution system 18) may be connected to network 30 through secondary network 32, as illustrated with phantom link line 36.

Users 14, 20, 22, 24, 26 may access media distribution system 18 through various client electronic devices, examples of which may include but are not limited to personal media devices 12, 38, 40, 42, client computer 44, laptop computers (not shown), personal digital assistants (not shown), cellular telephones (not shown), televisions (not shown), cable boxes (not shown), internet radios (not shown), or dedicated network devices (not shown), for example.

The various client electronic devices may be directly or indirectly coupled to network 30 (or network 32). For example, client computer 44 is shown directly coupled to network 30 via a hardwired network connection. Further, client computer 44 may execute a client application 46 (examples of which may include but are not limited to Microsoft Internet Explorer™, Netscape Navigator™, Real-Rhapsody™ client, RealPlayer™ client, or a specialized interface) that allows e.g., user 22 to access and configure media distribution system 18 via network 30 (or network 32). Client computer 44 may run an operating system, examples of which may include but are not limited to Microsoft Windows™, or Redhat Linux™.

The instruction sets and subroutines of client application 46, which are typically stored on a storage device 48 coupled to client computer 44, are executed by one or more processors (not shown) and one or more memory architectures (not shown) incorporated into client computer 44. Storage device 48 may include but are not limited to a hard disk drive, a tape drive, an optical drive, a RAID array, a random access memory (RAM), or a read-only memory (ROM).

As discussed above, the various client electronic devices may be indirectly coupled to network 30 (or network 32). For example, personal media device 38 is shown wireless coupled to network 30 via a wireless communication channel 50 established between personal media device 38 and wireless access point (i.e., WAP) 52, which is shown directly coupled to network 30. WAP 52 may be, for example, an IEEE 802.11a, 802.11b, 802.11g, Wi-Fi, and/or Bluetooth device that is capable of establishing secure communication channel 50 between personal media device 38 and WAP 52.

As is known in the art, all of the IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

In addition to being wirelessly coupled to network 30 (or network 32), personal media devices may be coupled to network 30 (or network 32) via a proxy computer (e.g., proxy computer 54 for personal media device 12, proxy computer 56 for personal media device 40, and proxy computer 58 for personal media device 42, for example).

Figure 2:
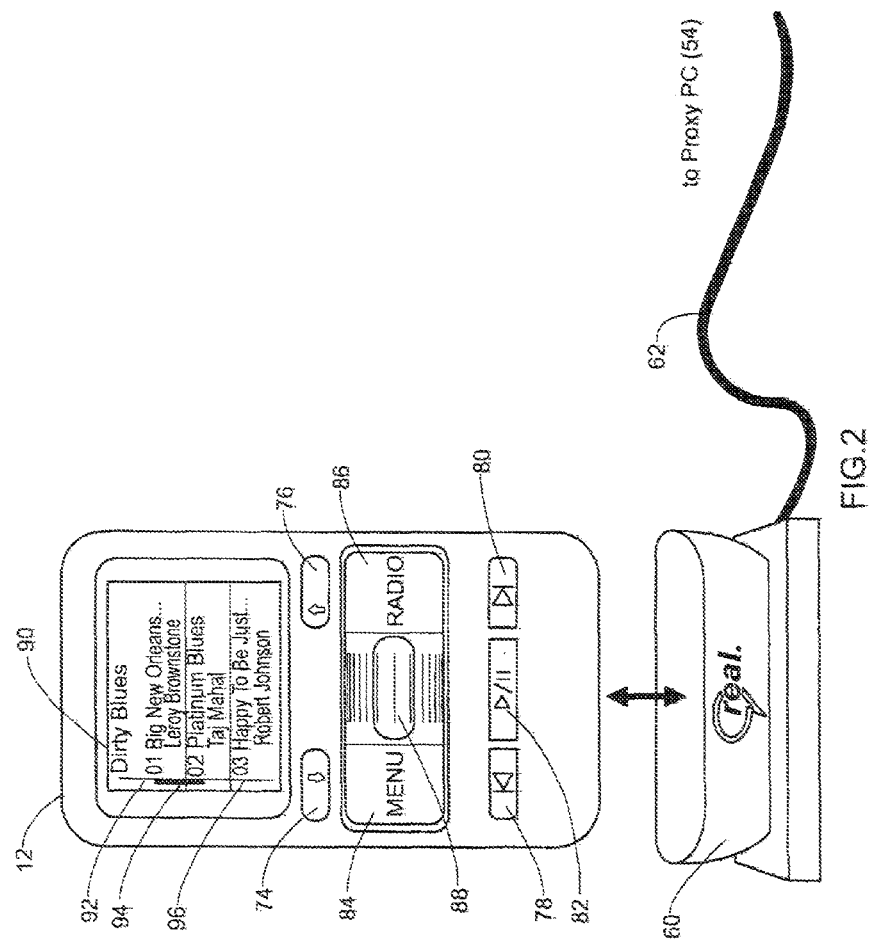
FIG. 2 is an isometric view of the personal media device of FIG. 1.

Personal Media Device:

For example and referring also to FIG. 2, personal media device 12 may be connected to proxy computer 54 via a docking cradle 60. Typically, personal media device 12 includes a bus interface (to be discussed below in greater detail) that couples personal media device 12 to docking cradle 60. Docking cradle 60 may be coupled (with cable 62) to e.g., a universal serial bus (i.e., USB) port, a serial port, or an IEEE 1394 (i.e., FireWire) port included within proxy computer 54.

The bus interface included within personal media device 12 may be a USB interface, and docking cradle 60 may function as a USB hub (i.e., a plug-and-play interface that allows for "hot" coupling and uncoupling of personal media device 12 and docking cradle 60).

Proxy computer 54 may function as an Internet gateway for personal media device 12. Accordingly, personal media device 12 may use proxy computer 54 to access media distribution system 18 via network 30 (and network 32) and obtain media content 16. Specifically, upon receiving a request for media distribution system 18 from personal media device 12, proxy computer 54 (acting as an Internet client on behalf of personal media device 12), may request the appropriate web page/service from computer 28 (i.e., the computer that executes media distribution system 18). When the requested web page/service is returned to proxy computer 54, proxy computer 54 relates the returned web page/service to the original request (placed by personal media device 12) and forwards the web page/service to personal media device 12. Accordingly, proxy computer 54 may function as a conduit for coupling personal media device 12 to computer 28 and, therefore, media distribution system 18.

Further, personal media device 12 may execute a device application 64 (examples of which may include but are not limited to RealRhapsody™ client, RealPlayer™ client, or a specialized interface). Personal media device 12 may run an operating system, examples of which may include but are not limited to Microsoft Windows CE™, Redhat Linux™, Palm OS™, or a device-specific (i.e., custom) operating system.

DRM process 10 is typically a component of device application 64 (examples of which may include but are not limited to an embedded feature of device application 64, a software plug-in for device application 64, or a stand-alone application called from within and controlled by device application 64). The instruction sets and subroutines of device application 64 and DRM process 10, which are typically stored on a storage device 66 coupled to personal media device 12, are executed by one or more processors (not shown) and one or more memory architectures (not shown) incorporated into personal media device 12. Storage device 66 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card.

An administrator 68 typically accesses and administers media distribution system 18 through a desktop application 70 (examples of which may include but are not limited to Microsoft Internet Explorer™, Netscape Navigator™, or a specialized interface) running on an administrative computer 72 that is also connected to network 30 (or network 32).

The instruction sets and subroutines of desktop application 70, which are typically stored on a storage device (not shown) coupled to administrative computer 72, are executed by one or more processors (not shown) and one or more memory architectures (not shown) incorporated into administrative computer 72. The storage device (not shown) coupled to administrative computer 72 may include but are not limited to a hard disk drive, a tape drive, an optical drive, a RAID array, a random access memory (RAM), or a read-only memory (ROM).

Figure 3:
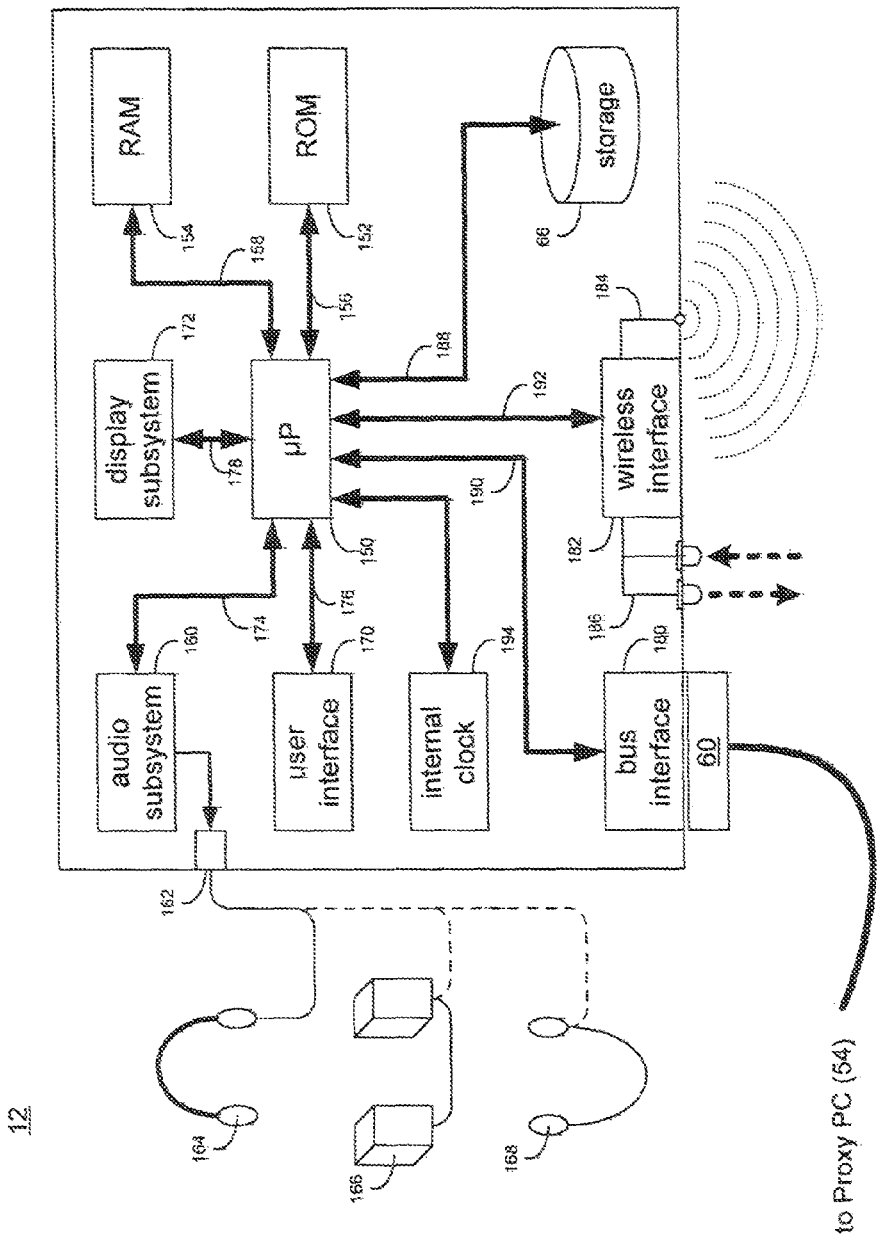
FIG. 3 is a diagrammatic view of the personal media device of FIG. 1.

Referring also to FIG. 3, a diagrammatic view of personal media device 12 is shown. Personal media device 12 typically includes microprocessor 150 (e.g., an ARM™ microprocessor produced by Intel™ of Santa Clara, Calif.), non-volatile memory (e.g., read-only memory 152), and volatile memory (e.g., random access memory 154); each of which may be interconnected via one or more data/system buses 156, 158. Personal media device 12 may also include an audio subsystem 160 for providing e.g., an analog audio signal to an audio jack 162 for removable engaging e.g., headphone assembly 164, remote speaker assembly 166, or ear bud assembly 168, for example. Alternatively, personal media device 12 may be configured to include one or more internal audio speakers (not shown).

Personal media device 12 may also include a user interface 170 and a display subsystem 172. User interface 170 may receive data signals from various input devices included within personal media device 12, examples of which may include (but are not limited to): rating switches 74, 76; backward skip switch 78; forward skip switch 80; play/pause switch 82; menu switch 84; radio switch 86; and slider assembly 88, for example. Display subsystem 172 may provide display signals to display panel 90 included within personal media device 12. Display panel 90 may be an active matrix liquid crystal display panel, a passive matrix liquid crystal display panel, or a light emitting diode display panel, for example.

Audio subsystem 160, user interface 170, and display subsystem 172 may each be coupled with microprocessor 150 via one or more data/system buses 174, 176, 178 (respectively).

During use of personal media device 12, display panel 90 may be configured to display e.g., the title and artist of various pieces of media content 92, 94, 96 stored within personal media device 12. Slider assembly 88 may be used to scroll upward or downward through the list of media content stored within personal media device 12. When the desired piece of media content is highlighted (e.g., "Phantom Blues" by "Taj Mahal"), user 14 may select the media content for rendering using play/pause switch 82. User 14 may skip forward to the next piece of media content (e.g., "Happy To Be Just . . . " by "Robert Johnson") using forward skip switch 80; or skip backward to the previous piece of media content (e.g., "Big New Orleans . . . " by "Leroy Brownstone") using backward skip switch 78. Additionally, user 14 may rate the media content as they listen to it by using rating switches 74, 76.

As discussed above, personal media device 12 may include a bus interface 180 for interfacing with e.g., proxy computer 54 via docking cradle 60. Additionally and as discussed above, personal media device 12 may be wireless coupled to network 30 (and/or other personal media devices) via e.g., a wireless communication channel 50 established between personal media device 12 and e.g., WAP 52. Accordingly, personal media device 12 may include a wireless interface 182 for wirelessly-coupling personal media device 12 to network 30 (or network 32) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device (such as personal media device 40).

As discussed above, personal media device 12 may include a storage device 66 for storing the instruction sets and subroutines of device application 64 and DRM process 10. Additionally, storage device 66 may be used to store media data files downloaded from media distribution system 18 and to temporarily store media data streams (or portions thereof) streamed from media distribution system 18.

Storage device 66, bus interface 180, and wireless interface 182 may each be coupled with microprocessor 150 via one or more data/system buses 188, 190, 192 (respectively).

As discussed above, media distribution system 18 distributes media content to users 14, 20, 22, 24, 26, such that the media content distributed may be in the form of media data streams and/or media data files.

Accordingly, media distribution system 18 may be configured to only allow users to download media data files. For example, user 14 may be allowed to download, from media distribution system 18, media data files (i.e., examples of which may include but are not limited to MP3 files or AAC files), such that copies of the media data file are transferred from computer 28 to personal media device 12 (being stored on storage device 66).

Alternatively, media distribution system 18 may be configured to only allow users to receive and process media data streams of media data files. For example, user 22 may be allowed to receive and process (on client computer 44) media data streams received from media distribution system 18. As discussed above, when media content is streamed from e.g., computer 28 to client computer 44, a copy of the media data file is not permanently retained on client computer 44.

Further, media distribution system 18 may be configured to allow users to receive and process media data streams and download media data files. Examples of such a media distribution system include the Rhapsody™ and Rhapsody-to-Go™ services offered by RealNetworks™ of Seattle, Wash. Accordingly, user 14 may be allowed to download media data files and receive and process media data streams from media distribution system 18. Therefore, copies of media data files may be transferred from computer 28 to personal media device 12 (i.e., the received media data files being stored on storage device 66); and streams of media data files may be received from computer 28 by personal media device 12 (i.e., with portions of the received stream temporarily being stored on storage device 66). Additionally, user 22 may be allowed to download media data files and receive and process media data streams from media distribution system 18. Therefore, copies of media data files may be transferred from computer 28 to client computer 44 (i.e., the received media data files being stored on storage device 48); and streams of media data files may be received from computer 28 by client computer 44 (i.e., with portions of the received streams temporarily being stored on storage device 48).

Typically, in order for a device to receive and process a media data stream from e.g., computer 28, the device must have an active connection to computer 28 and, therefore, media distribution system 18. Accordingly, personal media device 38 (i.e., actively connected to computer 28 via wireless channel 50), and client computer 44 (i.e., actively connected to computer 28 via a hardwired network connection) may receive and process media data streams from e.g., computer 28.

As discussed above, proxy computers 54, 56, 58 may function as a conduit for coupling personal media devices 12, 40, 42 (respectively) to computer 28 and, therefore, media distribution system 18. Accordingly, when personal media devices 12, 40, 42 are coupled to proxy computers 54, 56, 58 (respectively) via e.g., docking cradle 60, personal media devices 12, 40, 42 are actively connected to computer 28 and, therefore, may receive and process media data streams provided by computer 28.

User Interfaces:

As discussed above, media distribution system 18 may be accessed using various types of client electronic devices, which include but are not limited to personal media devices 12, 38, 40, 42, client computer 44, personal digital assistants (not shown), cellular telephones (not shown), televisions (not shown), cable boxes (not shown), internet radios (not shown), or dedicated network devices (not shown), for example. Typically, the type of interface used by the user (when configuring media distribution system 18 for a particular client electronic device) will vary depending on the type of client electronic device to which the media content is being streamed/downloaded.

For example, as the embodiment shown (in FIG. 2) of personal media device 12 does not include a keyboard and the display panel 90 of personal media device 12 is compact, media distribution system 18 may be configured for personal media device 12 via proxy application 98 executed on proxy computer 54.

The instruction sets and subroutines of proxy application 98, which are typically stored on a storage device 99 coupled to proxy computer 54, are executed by one or more processors (not shown) and one or more memory architectures (not shown) incorporated into proxy computer 54. Storage device 99 coupled to proxy computer 54 may include but are not limited to a hard disk drive, a tape drive, an optical drive, a RAID array, a random access memory (RAM), or a read-only memory (ROM).

Additionally and for similar reasons, personal digital assistants (not shown), cellular telephones (not shown), televisions (not shown), cable boxes (not shown), internet radios (not shown), and dedicated network devices (not shown) may use proxy application 98 executed on proxy computer 54 to configure media distribution system 18.

Further, the client electronic device need not be directly connected to proxy computer 54 for media distribution system 18 to be configured via proxy application 98. For example, assume that the client electronic device used to access media distribution system 18 is a cellular telephone. While cellular telephones are typically not physically connectable to e.g., proxy computer 54, proxy computer 54 may still be used to remotely configure media distribution system 18 for use with the cellular telephone. Accordingly, the configuration information (concerning the cellular telephone) that is entered via e.g., proxy computer 54 may be retained within media distribution system 18 (on computer 28) until the next time that the user accesses media distribution system 18 with the cellular telephone. At that time, the configuration information saved on media distribution system 18 may be downloaded to the cellular telephone.

For systems that include keyboards and larger displays (e.g., client computer 44), client application 46 may be used to configure media distribution system 18 for use with client computer 44.

Figure 4:
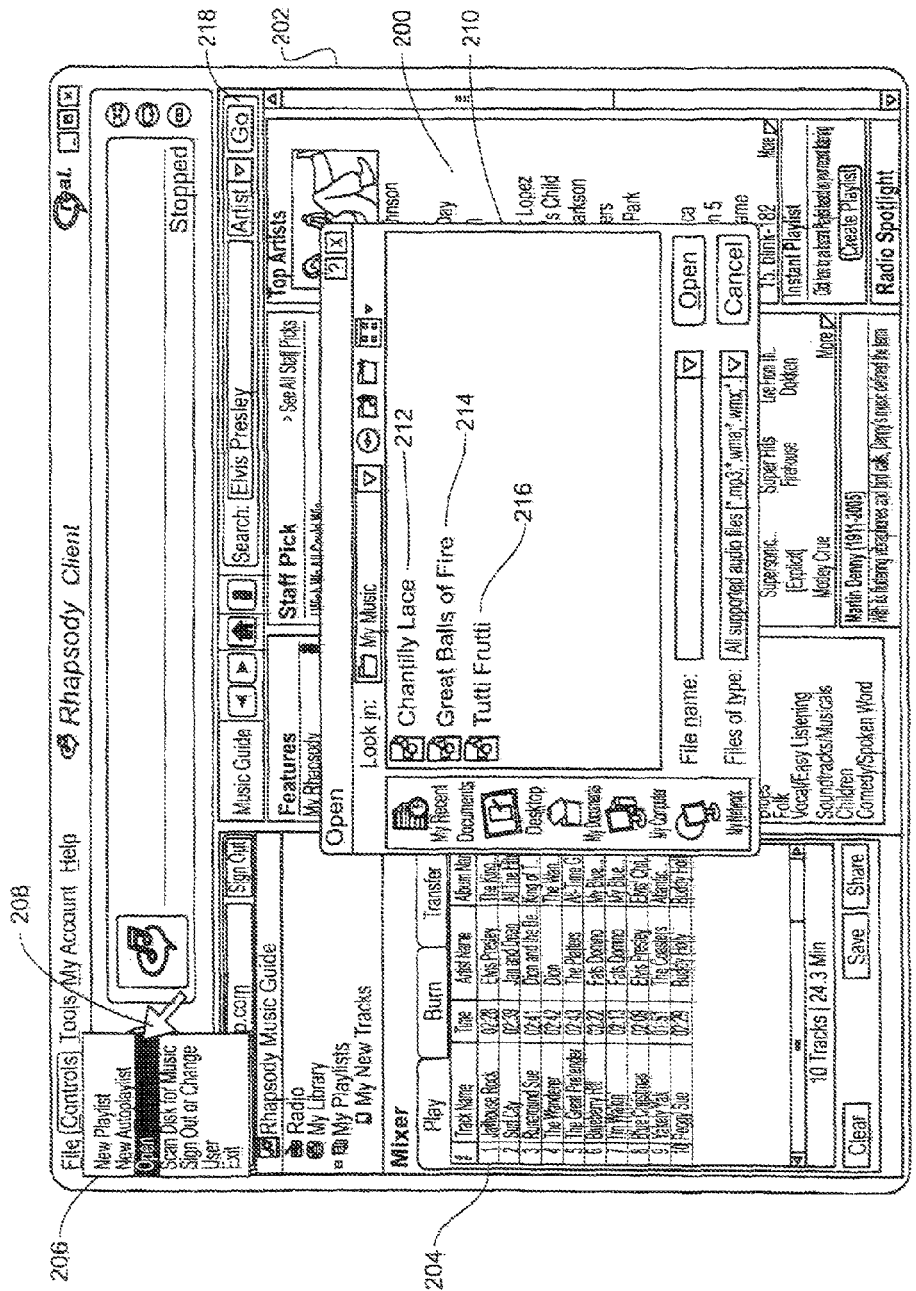
FIG. 4 is a display screen rendered by the client application of FIG. 1.

Referring also to FIG. 4, when using client application 46 to access media distribution system 18, user 22 may be presented with an information display screen 200 rendered by client application 46. Client application 46 typically includes a user interface 202 (e.g., a web browser) for interfacing with media distribution system 18 and viewing information display screen 200.

When e.g., user 22 streams/downloads media content from e.g., computer 28, media distribution system 18 may monitor the media content streamed/downloaded to the user's client electronic device (e.g., client computer 44, for example), resulting in the generation of a media history file 100 (FIG. 1) for that user. While media history file 100 is typically maintained locally (e.g., maintained on client computer 44), media history file 100 may alternatively/additionally be maintained remotely (e.g., maintained on computer 28) as a remote media history file 100'.

The user (e.g., user 22) may save this media history file (or portions thereof) as a playlist. A playlist is typically a group of tracks (examples of which may include, but are not limited to, songs, videos, news broadcasts, sports broadcasts, etc) that media distribution system 18 will render in sequence. This, in turn, allows the user to compile custom music compilations (in the form of multiple playlists).

A history window 204 may be rendered by client application 46 that itemizes the information contained within media history file 100. In this example, history window 204 itemizes ten (10) media data streams (e.g., "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue"), thus indicating that user 22 had previously listened to those ten (10) media data streams.

In addition to media data streams (i.e., media data streams received from a remote device e.g., computer 28), client application 46 allows user 12 to render local media data files. As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example. These local media data files are typically stored locally on e.g., storage device 48 coupled to client computer 44.

If user 22 wishes to render a local media data file (i.e., a file stored on client computer 44), user 22 may e.g., select the file(s) to be rendered using client application 46. Accordingly, user 22 may select the dropdown "File" menu 206 using screen pointer 208, which may be controllable by a pointing device (e.g., a computer mouse, not shown). Selecting the "Open" command may result in client application 46 rendering file management window 210, which allows user 22 to select local media data files for playback.

In this example, file management window 210 defines three (3) local media data files, namely: "Chantilly Lace" 212; "Great Balls of Fire" 214; and "Tutti Frutti" 216, all of which are stored within the folder "My Music". User 22 may select any (or all) of these files for playback on client application 46.

A search window 218 allows a user (e.g., user 22) to search for media content. For example, user 22 may enter search terms (e.g., "Elvis Presley"), select the appropriate term type (e.g., artist), and execute a query. In the event that multiple artists satisfy the query, a result set may be generated from which user 22 may select e.g., the appropriate artist. Once the appropriate artist is selected, user 22 may review the various albums released by the selected artist (or that include tracks by the selected artist). User 22 may then stream or download one or more of the various tracks included within any of the albums. Once a track is rendered, identifying information concerning the track rendered may be added to local media history file 100 and/or remote media history file 100' and may be included in history window 204. In addition to being able to search for media content by artist, user 14 may also be able to search for media content by e.g., keyword, track, album and/or composer, for example.

Figure 5:
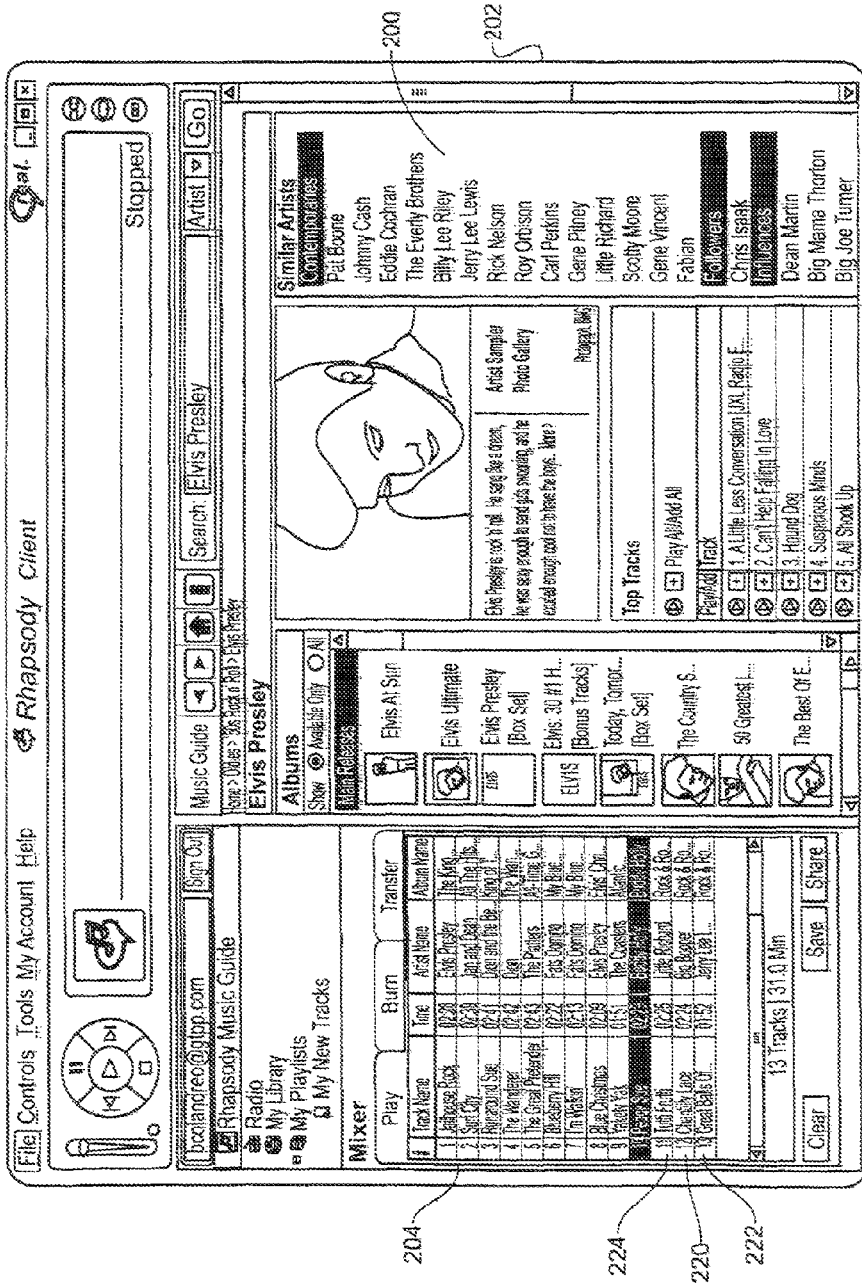
FIG. 5 is a display screen rendered by the client application of FIG. 1.

Referring also to FIG. 5 and assuming that user 22 selects all three local media data files for playback, media history file 100 may be amended to include three additional entries, namely one for "Chantilly Lace"; one for "Great Balls of Fire"; and one for "Tutti Frutti". Accordingly, as history window 204 itemizes the information contained within media history file 100, history window 204 will include three additional entries (i.e., entries 220, 222, 224), which correspond to local media data file "Chantilly Lace" 212; local media data file "Great Balls of Fire" 214; and local media data file "Tutti Frutti" 216.

Assuming that user 22 wishes to save this collection of music for future playback, user 22 may save the current media history file 100 (or a portion thereof) as a playlist 102 (FIG. 1). While playlist 102 is typically maintained locally (e.g., maintained on client computer 44), playlist 102 may alternatively/additionally be maintained remotely (e.g., maintained on computer 28) as a remote playlist 102'.

Figure 6:
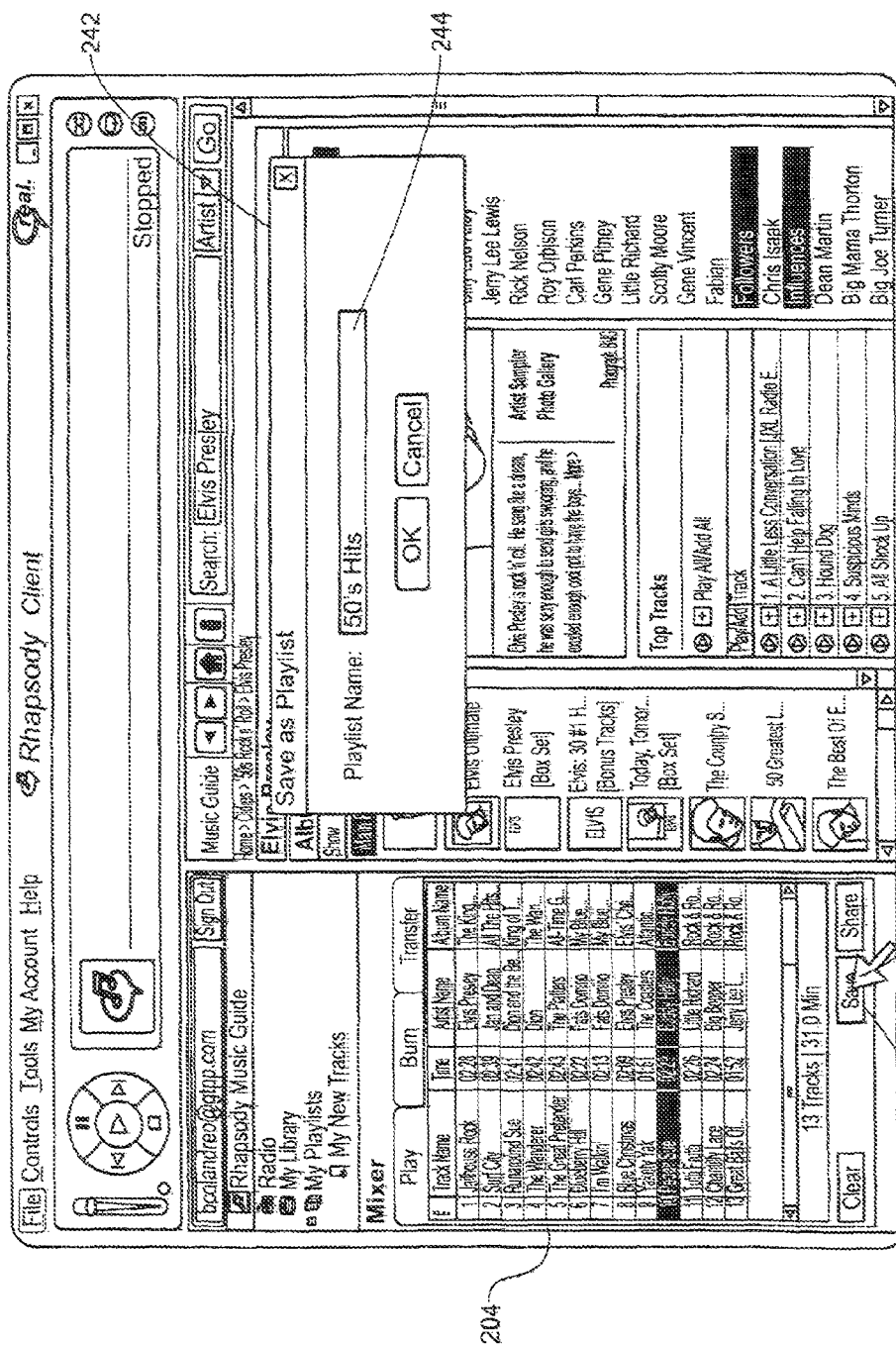
FIG. 6 is a display screen rendered by the client application of FIG. 1.

Referring also to FIG. 6, user 22 may select the "save" button 240 (using screen pointer 208). Once the "save" button 240 is selected, a playlist naming window 242 may be rendered (by client application 46) that allows user 22 to specify a unique name for playlist 102 within the name field 244 of playlist naming window 242.

Assuming that user 22 selects "50's Hits" as a playlist name, playlist 102 is saved (i.e., as "50's Hits") and defines the location of all of the pieces of media content itemized within history window 204.

Figure 7:
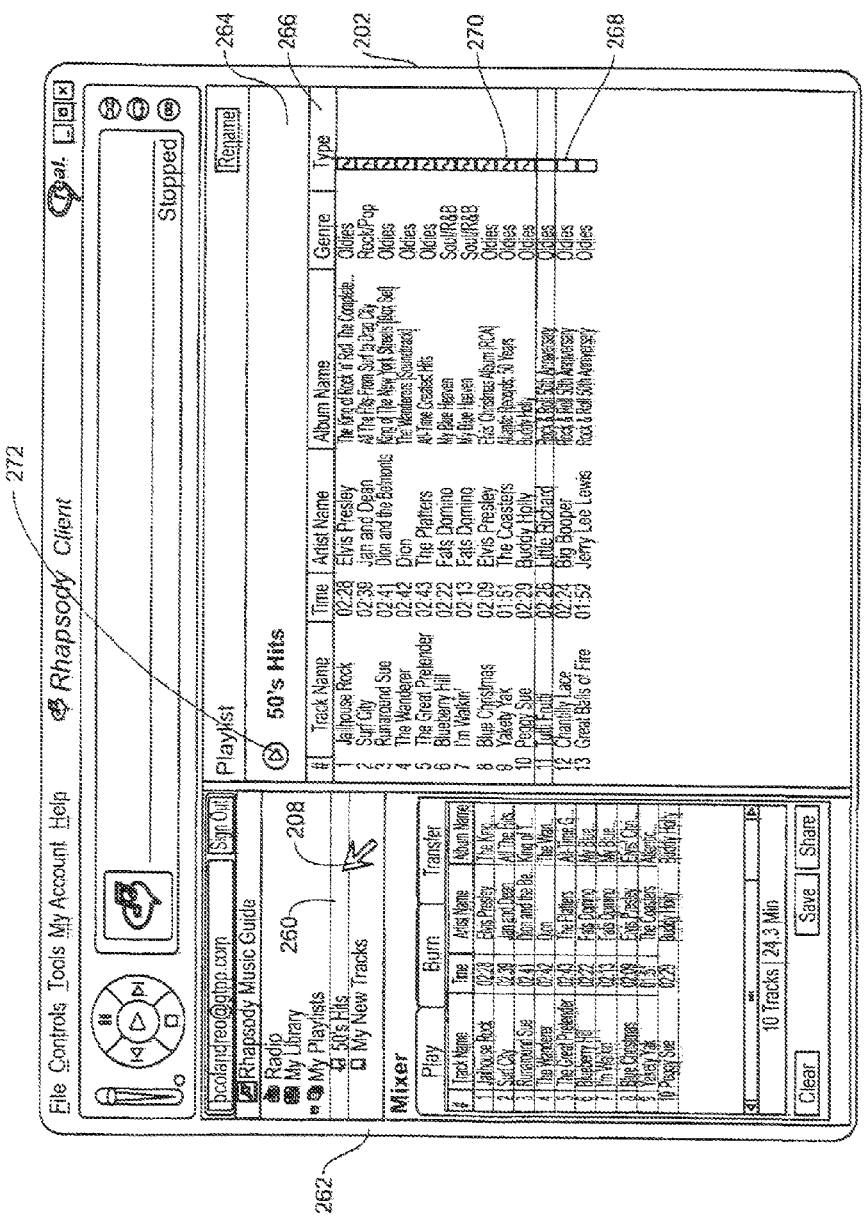
FIG. 7 is a display screen rendered by the client application of FIG. 1.

Referring also to FIG. 7, once playlist 102 is stored, a link 260 to playlist 102 (e.g., "50's Hits") appears in directory window 262. User 22 may then select link 260 using screen pointer 208. Once selected, the tracks included within playlist 102 (e.g., "50's Hits") are itemized within a playlist window 264 (e.g., a web page) viewable via user interface 202. As discussed above, ten of these entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") define the location of media data streams and three of these entries (namely "Tutti Frutti"; "Chantilly Lace"; and "Great Balls of Fire") define the location of media data files.

Typically, playlist window 264 includes hyperlinks that locate (i.e., provide addresses for) the streams/files associated with the individual entries itemized within playlist 102. This location information may be stored within playlist 102. For example, the following table correlates the track name of an entry in playlist 102 with an address for the stream/file associated with that track name:

| Track Name | Address |
| --- | --- |
| Jailhouse Rock | www.musicshop.com\songs\jailhouse_rock.ram |
| Surf City | www.musicshop.com\songs\surf_city.ram |

-continued

| Track Name | Address |
| --- | --- |
| Runaround Sue | www.musicshop.com\songs\runaround_sue.ram |
| The Wanderer | www.musicshop.com\songs\the_wanderer.ram |
| The Great Pretender | www.musicshop.com\songs\the_great_pretender.ram |
| Blueberry Hill | www.musicshop.com\songs\blueberry_hill.ram |
| I'm Walkin' | www.musicshop.com\songs\im_walkin.ram |
| Blue Christmas | www.musicshop.com\songs\blue_christmas.ram |
| Yakety Yak | www.musicshop.com\songs\yakety_yak.ram |
| Peggy Sue | www.musicshop.com\songs\peggy_sue.ram |
| Tutti Frutti | c:\my music\tutti_frutti.mp3 |
| Chantilly Lace | c:\my music\chantilly_lace.mp3 |
| Great Balls of Fire | c:\my music\great_balls_of_fire.mp3 |

As the first ten entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") identify media data streams, the address provided for each entry points to a media stream available from e.g., media distribution system 18. Further, as the last three entries (namely "Tutti Frutti"; "Chantilly Lace"; and "Great Balls of Fire") identify media data files, the address provided for each entry points to a media data file available from e.g., client computer 44.

Playlist window 264 is typically tabular and may include a column 266 identifying a media type (i.e., media data stream or media data file, for example) for each entry within playlist window 264. Typically, column 266 includes icons that identify the media type (e.g., icon 268 identifies a media data file and icon 270 identifies a media data stream). User 22 may select the "play" button 272 to render playlist 102.

As discussed above, media distribution system 18 typically provides media data streams and/or media data files to users (e.g., user 22). Typically, metadata is associated with each media data stream provided by media distribution system 18. This metadata may include (but is not limited to) an artist identifier, an album identifier, a track identifier, an album cover image, and a music genre identifier, for example.

Accordingly, whenever e.g., user 12 renders a remote media data stream, media distribution system 18 may compile and save this metadata (on a per-user basis) to track e.g., listening trends and musical preferences of individual users, for example.

As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example.

If the purchased download and/or the subscription download were provided by media distribution system 18, these local media data files would typically also include the metadata described above. Accordingly, when these purchased/subscription downloads are rendered by e.g., user 22, the metadata concerning these purchased/subscription downloads may be transmitted from computer 44 to computer 28, such that the metadata may be compiled and saved (on a per user basis) to track e.g., listening trends and musical preferences, for example.

However, for media data files that were e.g., extracted from music compact discs, these data files may not include the above-described metadata. As discussed above, media data files (i.e., files stored on client computer 44) may be rendered using client application 46 and added to playlists (e.g., playlist 102). Accordingly, whenever user 22 attempts to add a media data file (that does not include metadata) to a playlist (e.g., playlist 102), user 22 may be prompted to provide metadata concerning that media data file.

Figure 8:
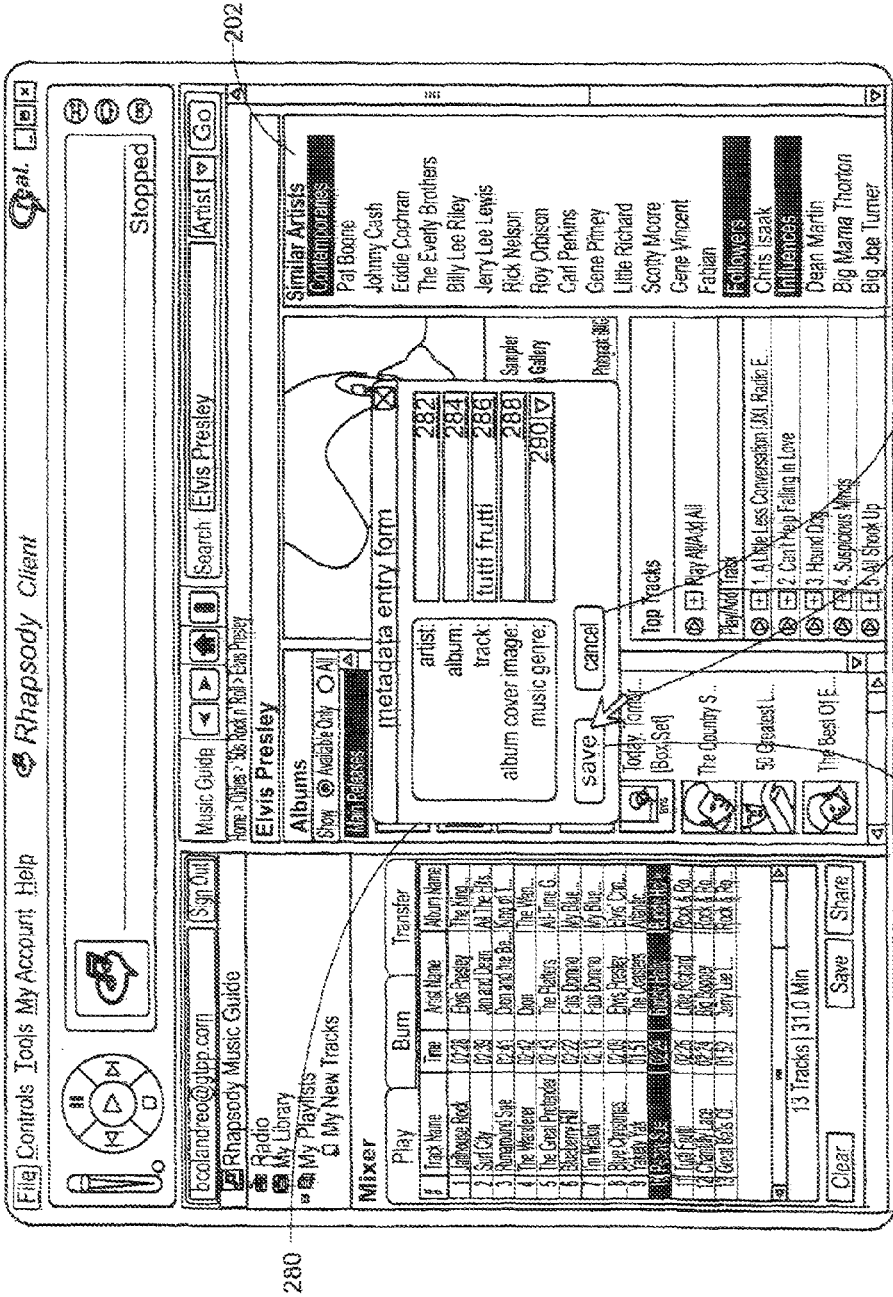
FIG. 8 is a display screen rendered by the client application of FIG. 1.

Referring also to FIG. 8 and continuing with the above-stated example, if user 22 attempts to save a playlist (e.g., playlist 102) that includes three local media data files (namely "Tutti Frutti"; "Chantilly Lace"; and "Great Balls of Fire"), assuming that these three local media data files do not include metadata, client application 46 may render a metadata entry form 280 that allows user 22 to enter metadata concerning each of the three media data files.

In this example, metadata entry form 280 includes five user-editable fields, namely an artist field 282, an album field 284, a track field 286, an album cover image field 288, and a music genre field 290. Album cover image field 288 may allow user 22 to define a drive, a path, and a filename for an album cover image. Music genre field 290 may be a drop-down menu (operable via screen pointer 208) that allows user 22 to select a music genre from a number of predefined music genres (not shown).

Typically, if the title of the media data file is descriptive of the track name, the track field 286 may be automatically-populated with what client application 46 suspects is the track title. As the first local media data file is named "Tutti Frutti", track field 286 would typically be populated with the suspected name "Tutti Frutti". User 22 may populate the remaining fields and select the save button 292 (using screen pointer 208) or alternatively select the cancel button 294.

In order to further automate the metadata generation process, client application 44 may interface with a remote metadata database (not shown) served by e.g., media distribution system 18 or a third party (not shown). This metadata database may define metadata for various tracks and albums. An example of such a database is the CDDB™ database maintained by Gracenote™ of Emeryville, Calif. (www.gracenote.com). For example, if user 22 ripped each track from an entire compact disc, the metadata database may be accessed by client application 44 and a query may be structured that defines e.g., the total number of tracks included on the compact disc, the length of each track included on the compact disc, and the total length of the compact disc. Assuming that a definitive result is produced by this query, the metadata for each track ripped from the compact disc would be produced. In the event that an indefinite result set (i.e., one that identifies multiple possible compact discs) is generated, user 22 may be prompted to select the appropriate compact disc from a list of possible matches (not shown).

As discussed above, the type of interface used by the user (when configuring media distribution system 18 for a client electronic device) may vary depending on the type and the capabilities of the client electronic device to which the media content is being streamed/downloaded. Accordingly and as discussed above, media distribution system 18 may be configured for personal media device 12 via proxy application 98 executed on proxy computer 54.

Proxy application 98 may be automatically executed upon personal media device 12 being placed into docking cradle 60 by e.g., user 14. Alternatively, proxy application 98 may be fully or partially loaded upon boot up of proxy computer 54. Proxy application 98 may then operate in the background until personal media device 12 is placed into docking cradle 60, at which time proxy application 98 may be fully loaded and/or moved to the foreground for execution. Further, proxy application 98 may be manually executed by user 14. As will be discussed below in greater detail, proxy application 98 (once executed) may be used to e.g., configure personal media device 12 and transfer media data files to and remove media data files from personal media device 12, for example.

Figure 9:
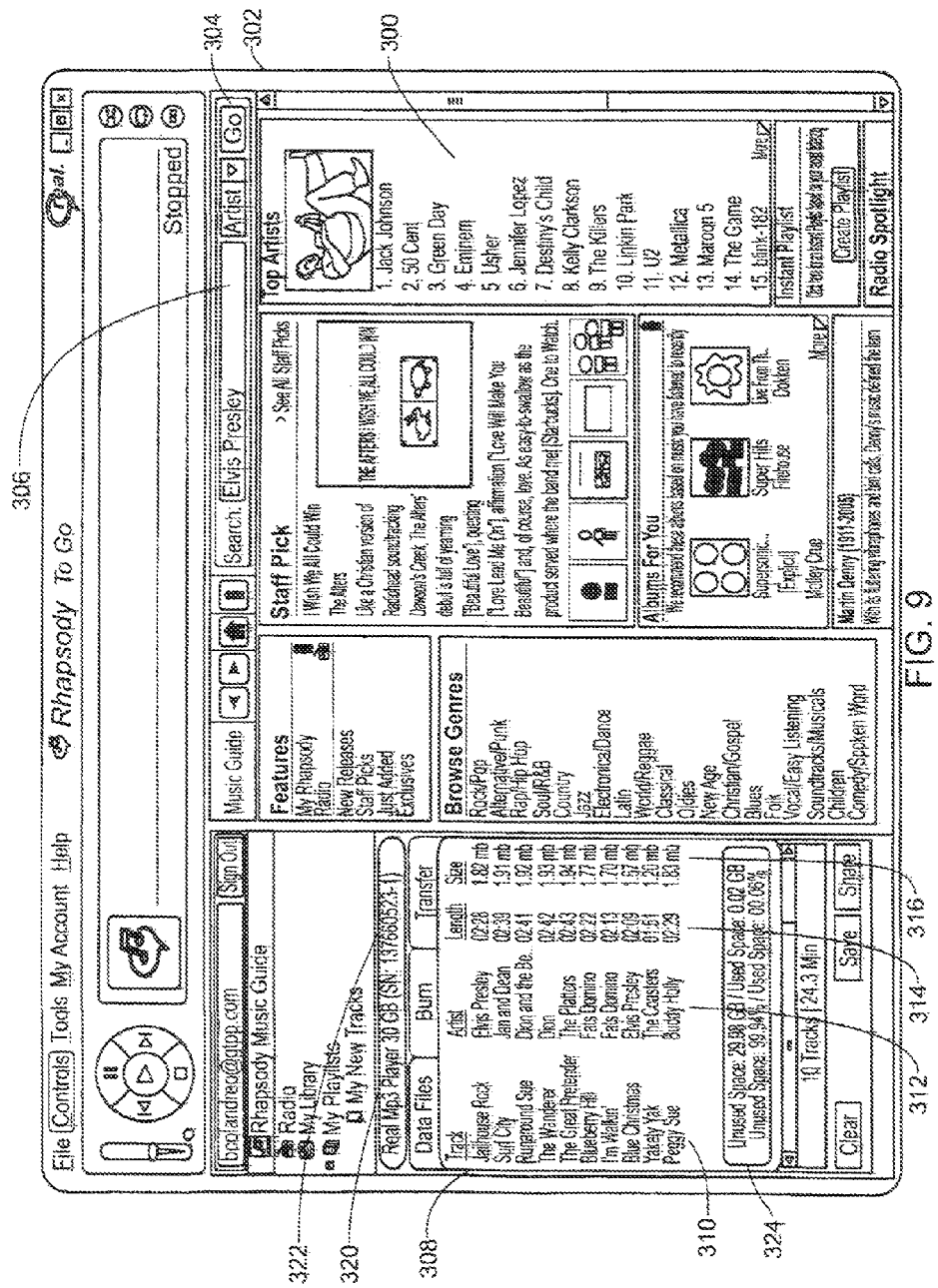
FIG. 9 is a display screen rendered by the proxy application of FIG. 1.

Referring also to FIG. 9, when using proxy application 98 to access media distribution system 18, user 14 may be presented with a information display screen 300 rendered by proxy application 98. Proxy application 98 typically includes a user interface 302 (e.g., a web browser) for interfacing with media distribution system 18 and viewing information display screen 300.

A search window 304 allows a user (e.g., user 14) to search for media content. For example, user 14 may enter search terms (e.g., "Elvis Presley") into search field 306, select the appropriate term type (e.g., artist), and execute a query. In the event that multiple artists satisfy the query, a result set may be generated from which user 14 may select e.g., the appropriate artist. Once the appropriate artist is selected, user 14 may review the various albums released by the selected artist (or that include tracks by the selected artist). User 14 may then download (for use on personal media device 12) one or more of the various tracks included within any of the albums. In addition to being able to search for media content by artist, user 14 may also be able to search for media content by e.g., keyword, track, album and/or composer.

Additionally, in a fashion similar to that of client application 46, proxy application 98 may be configured to allow user 12 to render (via proxy computer 54) one or more of the various tracks included within any of the albums of the selected artist.

A content window 308 may be rendered by proxy application 98 that allows user 14 to review the contents of personal media device 12. As discussed above, personal media device 12 may be coupled to proxy computer 54 via e.g., a USB port, serial port, or FireWire port. Upon or during execution of proxy application 98, proxy application 98 may poll personal media device 12 to retrieve information concerning the media content currently on device 12. This polling may occur in a fashion similar to the manner in which the content of a USB hard drive is determined. In this particular example, content window 308 includes ten (10) entries, namely: "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue", thus indicating that ten (10) media data files had been previously downloaded to personal media device 12, which are typically stored on storage device 66 of personal media device 12.

Content window 308 may be tabular and itemize various pieces of information concerning the downloaded files, including the track 310, the artist 312, the track length 314 and the track size 316. Additionally, proxy application 98 my poll personal media device 14 to retrieve device identification information, which may be rendered within a device type field 320 and a device serial number field 322 included within content window 308. Further, content window 308 may include a summary information field 324 concerning the current capacity of device 12, including one or more of e.g., "Unused Space" in gigabytes; "Used Space" in gigabytes; "Unused Space" in percentage of total capacity; and "Used Space" in percentage of total capacity, for example.

Figure 10:
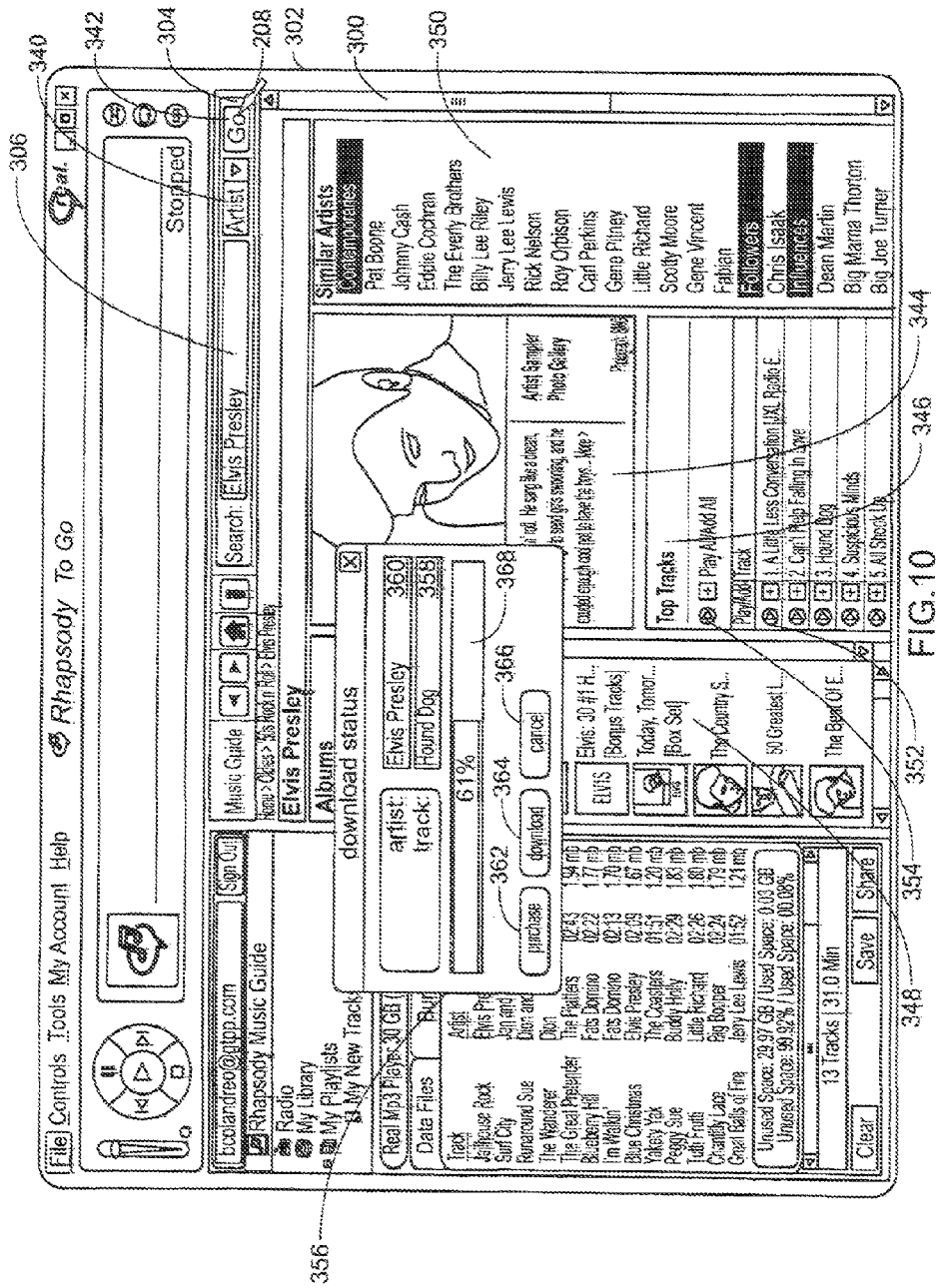
FIG. 10 is a display screen rendered by the proxy application of FIG. 1.

Referring also to FIG. 10 and continuing with the above-stated example, assume that user 14 enters the search term "Elvis Presley" into search field 306 of search window 304, selects the term type "artist" via dropdown menu 340, and executes the query by selecting the "Go" button 342 with screen pointer 208.

Assuming that no other artist satisfies the query, information screen 300 may be presented to user 14 with information concerning Elvis Presley, which may include: an artist information screen 344, a top track list 346, an album list 348, and a similar artist list 350, for example.

User 14 may download media data files from media distribution system 18 for use on personal media device 12 by selecting the download button 352 corresponding to the track to be downloaded. Additionally, user 14 may download groups of tracks (e.g., each track included within top track list 346, or all tracks included within an single album) by selecting the download all button 354 corresponding to the tracks to be downloaded.

Once user 14 selects a track for downloading, proxy application 98 may render a download window 356 that e.g., includes a track title field 358 that identifies the title of the track being downloaded and an artist field 360 that identifies the artist of the track being downloaded.

As discussed above, files may be downloaded from media distribution system 18 as purchased downloads (i.e., media content licensed to e.g., user 14 for use in perpetuity), or subscription downloads (i.e., media content licensed to e.g., user 14 for use while a valid subscription exists with media distribution system 18). Provided user 14 has a current subscription with media distribution system 18, there is typically no additional fee charged for each subscription download, as the downloaded media content is only renderable while the user has a valid subscription. However, a user typically must pay a fee (e.g., 79¢, 89¢, or 99¢, for example) for each purchased download, as the media content is renderable regardless of the status of the user's subscription.

Accordingly, download window 356 may include a purchase button 362 and a download button 364, both of which are selectable via screen pointer 208. In this example, if user 14 selects purchase button 362 with screen pointer 208, a media data file for "Hound Dog" by "Elvis Presley" will be transferred from computer 28 to personal media device 12. Typically, user 14 will be charged e.g., a one-time download fee for downloading this media data file. However, as this is a purchased download, the media data file received is renderable regardless of the status of the user's subscription with media distribution system 18.

Alternatively, if user 14 selects download button 364 with screen pointer 208, a media data file for "Hound Dog" by "Elvis Presley" will be transferred from computer 28 to personal media device 12. Typically, user 14 will not be charged a fee for downloading this media data file. However, as this is a subscription download, the media data file received is only renderable while user 14 has a valid subscription with media distribution system 18.

Download window 356 typically also includes a cancel button 366 for allowing user 14 to cancel the download and close download window 356.

If user 14 selects either purchase button 362 or download button 364, the download of the selected media data file will be initiated. Download window 356 may include a download status indicator 368 for indicating the progress of the download of e.g., "Hound Dog" by "Elvis Presley".

Figure 11:
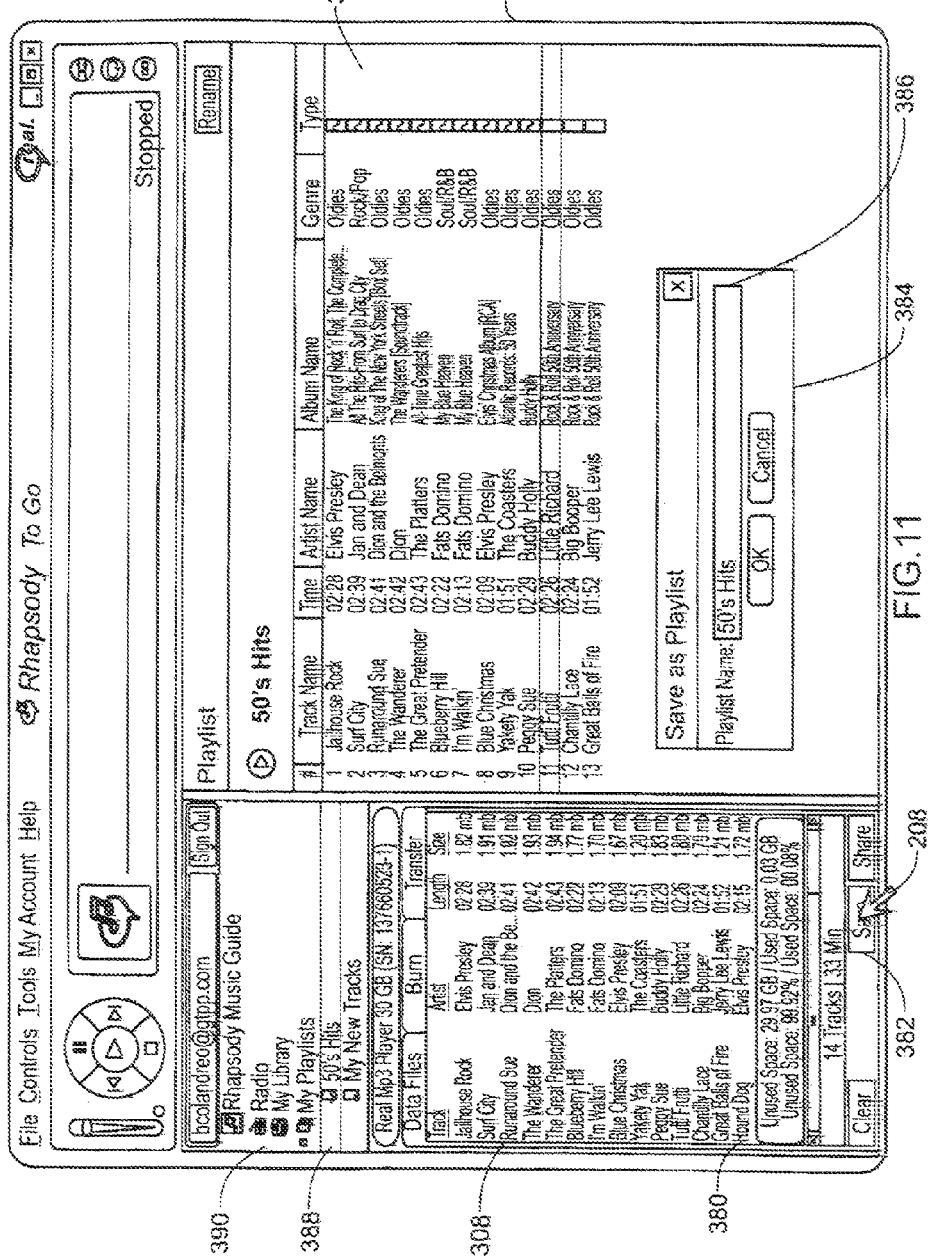
FIG. 11 is a display screen rendered by the proxy application of FIG. 1.

Referring also to FIG. 11, once the download of the media data file for "Hound Dog" by "Elvis Presley" is completed, content window 308 will be updated to include an entry 380 for "Hound Dog" by "Elvis Presley", indicating that "Hound Dog" by "Elvis Presley" was successfully downloaded from media distribution system 18 to personal media device 12.

In a fashion similar to that described above concerning client application 46, user 14 may use proxy application 98 to define playlists concerning various media data files stored on personal media device 12. For example, assume that user 14 wished to save the first thirteen tracks (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; "Peggy Sue"; "Tutti Frutti"; "Chantilly Lace"; and "Great Balls of Fire") as a playlist, user 14 would highlight the desired selection of tracks (using screen pointer 208) and select the save button 382 using screen pointer 208. A playlist naming window 384 may be rendered (by proxy application 98) that allows user 14 to specify a unique name for the playlist within the name field 386 of playlist naming window 384.

Assuming that user 14 selects "50's Hits" as a playlist name, playlist 104 (FIG. 1) named "50's Hits" may be defined that locates (within personal media device 12) all of the pieces of media content itemized within playlist 104. Once playlist 104 is stored, a link 388 to playlist 104 (e.g., "50's Hits") appears in directory window 390. User 14 may then select link 388 using screen pointer 208.

Once selected, the tracks included within playlist 104 (e.g., "50's Hits") are typically itemized within a playlist window 392 (e.g., a web page) viewable via user interface 302.

As with the playlists described above as being generated using client application 44, playlists generated using proxy application 98 are typically maintained locally (e.g., maintained on personal media device 12). However and as discussed above, playlists may alternatively/additionally be maintained remotely (e.g., maintained on computer 28) as remote playlist 104'.

Device Initialization:

Media distribution system 18 is typically a subscription-based service, in that e.g., user 14 subscribes to media distribution system 18 and pays e.g., a monthly subscription fee to be granted access to media distribution system 18. Once user 14 subscribes to media distribution system 18, user 14 may obtain media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when accessing media distribution system 18, user 14 must provide user "credentials" that identify the user (e.g., user 14) and/or the device (e.g., device 12) to media distribution system 18. Upon receiving these credentials, media distribution system 18 may attempt to verify the credentials and, if verified, grant user 14 and/or device 12 access to media distribution system 18. The credentials received and verified by media distribution system 18 may include, but are not limited to, a user name, a user password, a user key, a device name, a device password, a device key, and/or one or more digital certificates.

Typically, upon personal media device 12 being placed into docking cradle 60, personal media device 12 establishes a connection with media distribution system 18 via proxy computer 54. As discussed above, Proxy computer 54 may function as an Internet gateway for personal media device 12 and, therefore, allow personal media device 12 to access computer 28 and media distribution system 18.

Once a connection is establish with media distribution system 18, DRM process 10 may be initiated. DRM process 10 is typically executed at the time personal media device 12 is initially configured (i.e., the first time personal media device 12 establishes a connection with media distribution system 18). As will be discussed below in greater detail, DRM process 10 may be systematically and repeatedly executed to verify that device 12 (and/or user 14) are active subscribers of media distribution system 18.

Figure 12A:
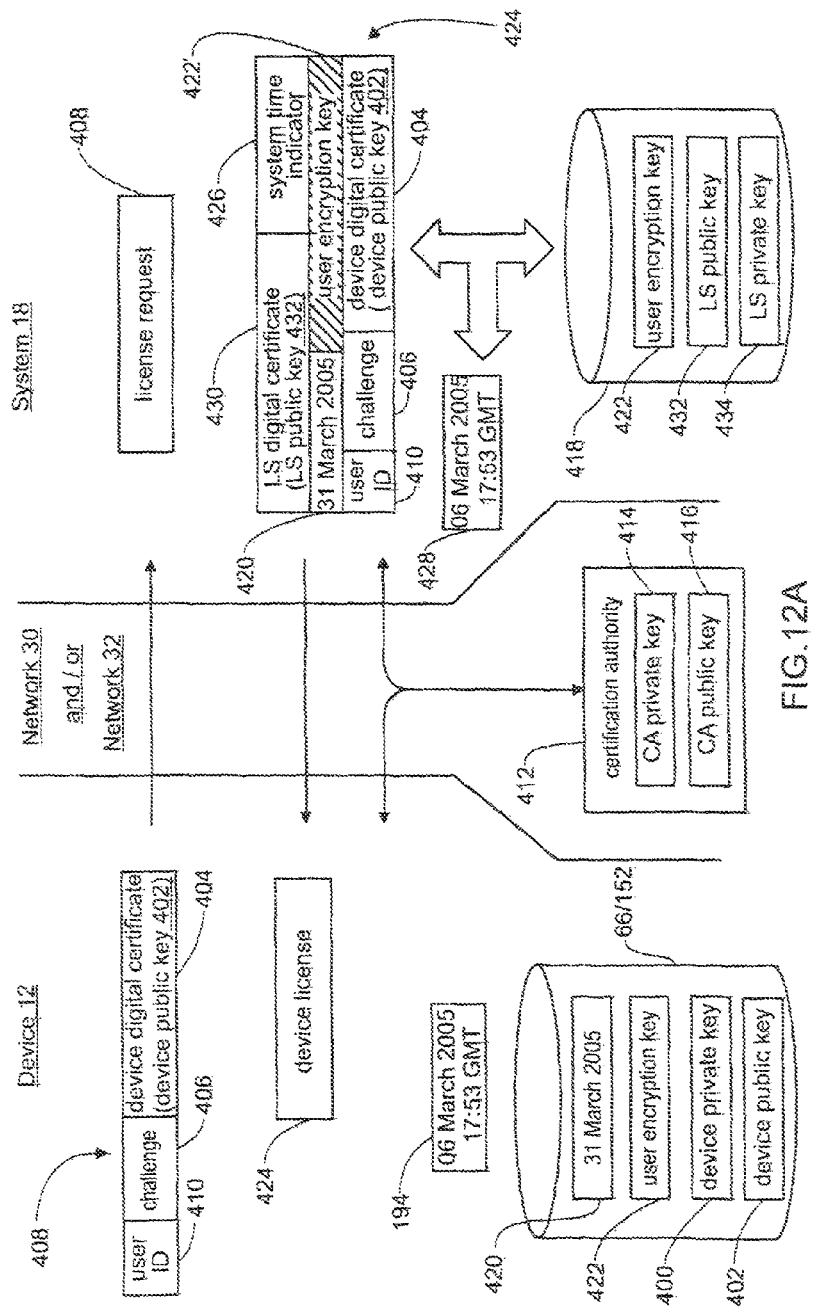
FIG. 12a is a diagrammatic view of the media distribution system, distributed computing network, and personal media device of FIG. 1.
Figure 12B:
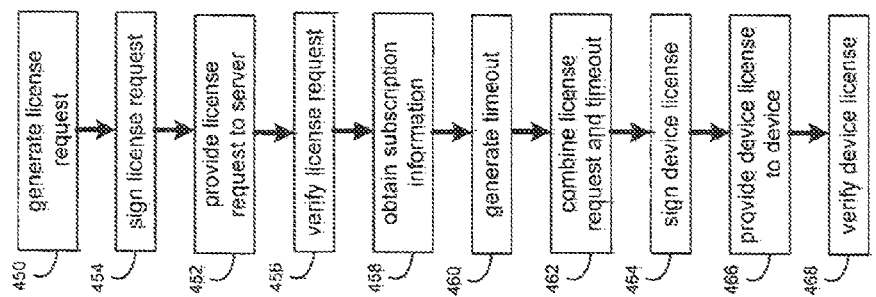
FIG. 12b is a flowchart of a process executed by the DRM process of FIG. 1.

Referring also to FIGS. 12a & 12b, at the time of manufacture, personal media device 12 may include a private encryption key (e.g., device private key 400) and a public encryption key (e.g., device public key 402) stored in non-volatile memory (e.g., ROM 152 and/or storage device 66). Keys 400, 402 may be 1024-bit asymmetric encryption keys and may be referred to as DRM (i.e., digital rights management) keys.

As is known in the art, a private key/public key encryption methodology allows users of an unsecure network (e.g., the Internet) to securely exchange data through the use of a pair of encryption keys, namely the private encryption key (e.g., device private key 400) and the public encryption key (e.g., device public key 402). The private key/public key encryption methodology is typically referred to as an asymmetric encryption methodology, in that the key used to encrypt a message is different than the key used to decrypt the message.

In private key/public key encryption, the private encryption key (e.g., device private key 400) and the public encryption key (e.g., device public key 402) are typically created simultaneously using the same algorithm (e.g., the RSA algorithm created by Ron Rivest, Adi Shamir, and Leonard Adlemana, for example). Device private key 400 is typically given only to the requesting party and device public key 402 is typically made publicly available (e.g., as part of digital certificate 404). Typically, device private key 400 is not shared and is maintained securely within e.g., personal media device 12.

Accordingly, when a secure message is to be sent from a sender to a recipient, the public key (e.g., device public key 402) of the recipient (which is readily accessible to the sender) is used to encrypt the message. Once encrypted, the message may be sent to the recipient and can only be decrypted using the recipient's private key (e.g., device private key 400). As private key 400 is maintained securely by the recipient, only the recipient can decrypt the encrypted message.

In addition to encrypting and decrypting messages, a sender may authenticate their identity by using their private key (e.g., device private key 400) to encrypt a digital certificate, which is then sent to a recipient (i.e., the person to which they are authenticating their identity). Accordingly, when the digital certificate is received by the recipient, the recipient can decrypt the encrypted digital certificate using the sender's public key (e.g., device public key 402), thus verifying that the digital certificate was encrypted using the sender's private key (e.g., device private key 400) and, therefore, verifying the identity of the sender.

DRM process 10 may generate a challenge 406, which is typically a random number generated by a random number generation process (not shown) included within personal media device 12. Once generated, challenge 406 may be paired with device digital certificate 404 (which typically includes device public key 402) to generate 450 a license request 408. Device digital certificate 404, which may be referred to as a DRM digital certificate, may include additional information such as a device serial number (e.g., 137660523-1 from device serial number field 322, FIG. 9), for example.

As discussed above, proxy application 98 allows the owner of device 12 (e.g., user 14) to: configure device 12 for use with media distribution system 18; and configure media distribution system 18 for use with device 12. Typically, when proxy application 98 is configured on proxy computer 54, user 14 may be required to provide user credentials that identify the user (e.g., user 14) and define a valid subscription that would allow user 14, device 12, and proxy application 98 to access media distribution system 18. Alternatively or additionally, personal media device 12 may be configured to allow the user (e.g., user 14) to directly enter the user credentials (via device 12) when device 12 is initially configured.

DRM process 10 may provide 452 license request 408 (via network 30 and/or network 32) to media distribution system 18. Additionally, if defined within personal media device 12, a user ID 410 (e.g., enumerating the user credentials described above) may also be included within license request 408. As discussed above, the user credentials (i.e., included within user ID 410) may include, but are not limited to, a user name, a user password, a user key, a device name, a device password, a device key, and/or one or more digital certificates. Prior to being provided 452 to media distribution system 18, DRM process 10 may digitally sign 454 license request 408 using device private key 400.

A digital signature is an electronic signature that uses the private key/public key encryption methodology (described above) and allows a sender of a message to authenticate their identity and the integrity of message sent. A digital signature may be used with both encrypted and non-encrypted messages and does not impede the ability of the receiver of the message to read the message.

For example, assume that DRM process 10 digitally signed 454 license request 408 prior to providing 452 license request 408 to media distribution system 18. When digitally signing 454 license request 408, a mathematical function is typically performed on the content of license request 408. For example, a message hash of license request 408 may be calculated by personal media device 12, such that a message hash is the mathematical output of a known one-way hash function that transforms a string of characters (e.g., license request 408) into a usually shorter fixed-length value that represents the original string of characters. As the hashing function is a one-way mathematical function, once a message hash is generated, the original message cannot be retrieved by processing the message hash. DRM process 10 may then encrypt the message hash (using device private key 400) to create the digital signature (not shown). This digital signature may then be attached to license request 408. Accordingly, while the digital signature is encrypted, the original message (i.e., license request 408) need not be. Therefore, license request 408 may be processed by media distribution system 18 even if the digital signature is not processed.

Continuing with the above-stated example, license request 408 and the digital signature may be received by media distribution system 18, and media distribution system 18 may use the same hash function to generate a message hash of license request 408. Media distribution system 408 will also decrypt the digital signature received from personal media device 12 using device public key 402 (included within device digital certificate 404) to recreate the message hash calculated by personal media device 12. Media distribution system 18 may then compare the decrypted digital signature to the message hash calculated by the media distribution system 408. If the message hashes match, the integrity of license request 408 and the identity of personal media device 12 are both verified 456.

Additionally, the integrity of device digital certificate 404 (and, therefore, device public key 402) may be verified when license request 408 is received from personal media device 12. Digital certificates are typically issued and digitally signed by e.g., certification authority 412 using CA private key 414. Accordingly, device digital certificate 404 may be verified by obtaining the CA public key 416 to verify the digital signature of device digital certificate 404.

Once challenge 406, device digital certificate 404, and user ID 410 (i.e., license request 408) are received by media distribution system 18, media distribution system 18 may access data store 418 to obtain 458 subscription information concerning user 14 (i.e., the user defined within user ID 410) and determine e.g., the date at which the current subscription of user 14 will expire. Data store 418 may be maintained on storage device 34 coupled to computer 28.

Assume, for illustrative purposes, that media distribution system 18 is configured to automatically bill each subscriber on the first of each month for the subscription fee for the upcoming month. Accordingly, on 1 Mar. 2005, user 14 will be billed for the cost of their March 2005 subscription. Therefore, if media distribution system 18 obtains 458 subscription information concerning user 14 on 6 Mar. 2005, the subscription information obtained 458 will indicate that user 14 has a valid subscription until 31 Mar. 2005.

Accordingly and continuing with the above-stated example, when license request 408 is received, media distribution system 18 may obtain 458 subscription information concerning user 14. In this example, the subscription information will indicate that user 14 is a valid subscriber (to media distribution system 18) through 31 Mar. 2005.

Media distribution system 18 may generate 460 a timeout indicator 420, which indicates e.g., the user's subscription information and the expiration date of the user's current subscription. In this example, timeout indicator 420 will indicate that e.g., the subscription of user 14 will expire on 31 Mar. 2005. Media distribution system 18 may obtain user encryption key 422 (i.e., the encryption key for user 14) from data store 418. Media distribution system 18 may then encrypt user encryption key 422, using device public key 402, to generate encrypted user encryption key 422' (shown with a hash fill). Timeout indicator 420, challenge 406, device digital certificate 404 (including device public key 402), user ID 410, and encrypted user encryption key 422' may be combined 462 (by media distribution system 18) to form device license 424.

Device license 424 may further include a system time indicator 426, which indicates the system time as defined by media distribution system 18. System time indicator 426 may be used to synchronize a system clock 194 (FIG. 3) included within personal media device 12 with a system clock 428 included within media distribution system 18.

Device license 424 may further include a licensing service (i.e., LS) digital certificate 430, which typically includes a licensing service (i.e., LS) public key 432.

Media distribution system 18 may digitally sign 464 device license 424 using licensing service (i.e., LS) private key 434 (of media distribution system 18) and provide 466 device license 424 to personal media device 12. Licensing system private key 434 may be stored on data store 418.

When device license 424 is received from media distribution system 18, DRM process 10 may verify the integrity of LS digital certificate 430 (and, therefore, LS public key 432). As discussed above, digital certificates are typically issued and digitally signed by e.g., certification authority 412 using CA private key 414. Accordingly, LS digital certificate 430 may be verified by obtaining the CA public key 416 to verify the digital signature of LS digital certificate 430.

DRM process 10 may use LS public key 432 (included within LS digital certificate 430) to verify 468 device license 424 (which was digitally signed using LS private key 434). DRM process 10 may additionally verify challenge value 406, device public key 402, and the device serial number (included within device digital certificate 404) to ensure that device license 424 is intended for personal media device 12. DRM process 10 may then decrypt, with device private key 400, encrypted user encryption key 422' (that was encrypted using device public key 402) to generate user encryption key 422, which may be stored in non-volatile memory, examples of which may include ROM 152 (FIG. 3) and/or storage device 66 (FIG. 3). User ID 410, user encryption key 422, and timeout indicator 420 may be saved on e.g., non-volatile memory, examples of which include ROM 152 (FIG. 3) and/or storage device 66 (FIG. 3), for use when personal media device 12 renders media content downloaded from media distribution system 18. Additionally, as will discussed below in greater detail, DRM process 10 may retain a copy of device license 424 for use when transferring media content between personal media device 12 and e.g., personal media device 40.

Obtaining Subscription Media Content:

As discussed above, once user 14 subscribes to media distribution system 18, user 14 may obtain from media distribution system 18 media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example.

Figure 13A:
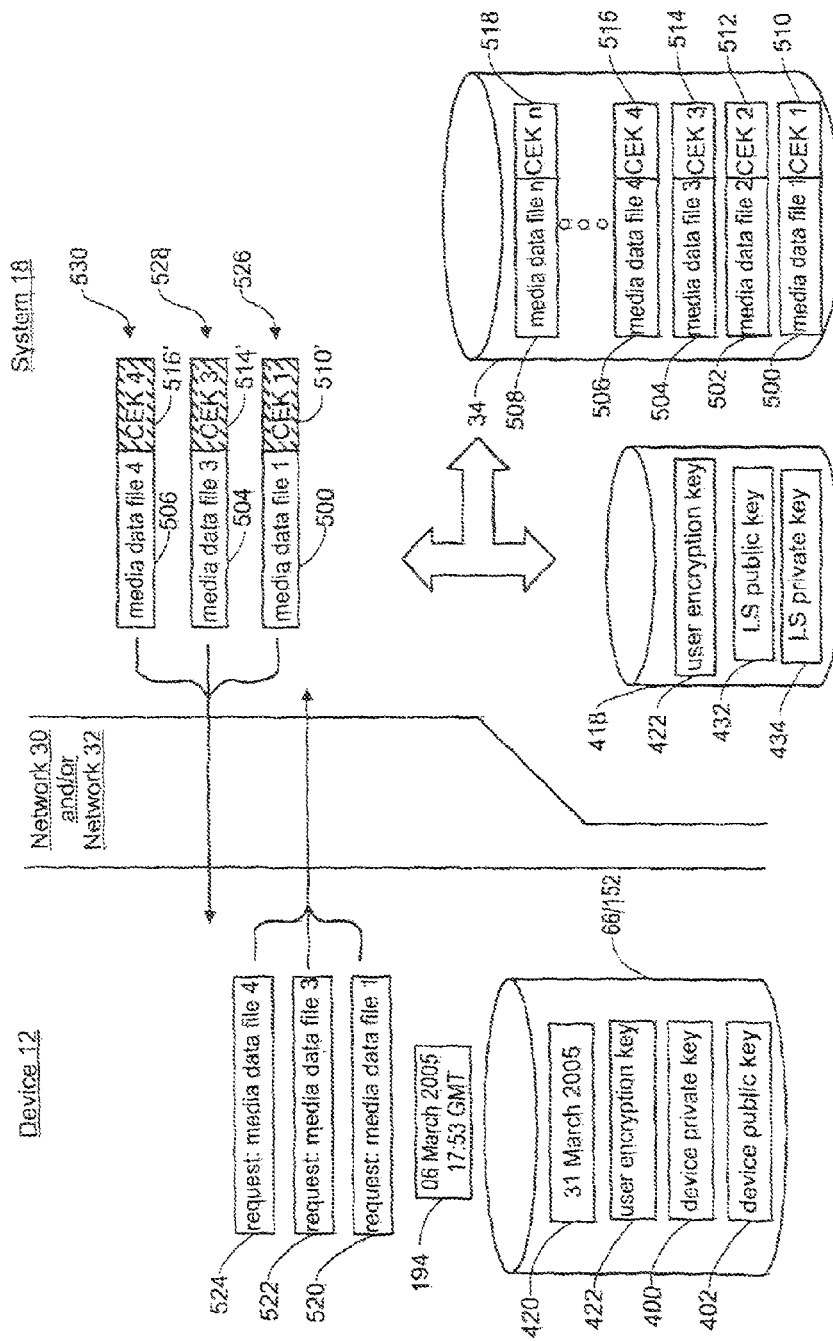
FIG. 13a is a diagrammatic view of the media distribution system, distributed computing network, and personal media device of FIG. 1.
Figure 13B:
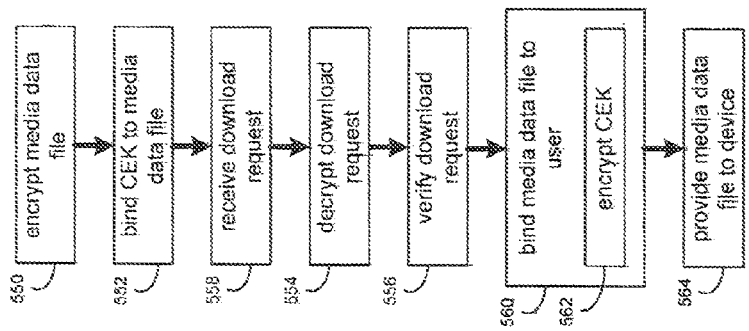
FIG. 13b is a flowchart of a process executed by the DRM process of FIG. 1.

Referring also to FIGS. 13*a* & 13*b*, each media data file 500, 502, 504, 506, 508 downloadable from media distribution system 18 may be encrypted 550 using a unique CEK (i.e., content encryption key) 510, 512, 514, 516, 518 respectively. For example, if media distribution system 18 includes 1,000,000 media data files available for downloading to e.g., personal media device 12, media distribution system 18 will encrypt 550 each media data file using a unique encryption key. Accordingly, for 1,000,000 media data files, 1,000,000 unique CEK's will be required, each of which is bound 552 to the media data file to which the CEK is related. Accordingly, CEK 510 may be bound 552 to media data file 500, and CEK 512 may be bound 552 to media data file 502, for example.

Each CEK (e.g., keys 510, 512, 514, 516, 518) may be a symmetric encryption key, in that the key used to encrypt a media data file may also be used to decrypt the same media data file. Typically, each media data file may be stored on e.g., storage device 34 attached to computer 28.

As discussed above, search window 304 (FIG. 10) of proxy application 98, may allow user 14 to search for media data files. Additionally, user 14 may download media data files from media distribution system 18 for use on personal media device 12 by selecting the download button 352 (FIG. 10) corresponding to the media data file to be downloaded.

Once the download of a media data file is initiated, personal media device 12 may submit the appropriate download request(s) to media distribution system 18. For example, assume that user 14 wished to download three media data files, namely media data files 500, 504, 506. DRM process 10 would submit download requests 520, 522, 524 respectively, each of which requests the desired file. For security and authentication purposes, download requests 520, 522, 524 may be e.g., encrypted by personal media device 12 (using e.g., LS public key 432) and/or digitally signed by personal media device 12 (using e.g., device private key 400). Accordingly, if a download request is encrypted (using e.g., LS public key 432), the encrypted download request may subsequently be decrypted 554 by media distribution system 18 using LS private key 434. Further, if a download request is digitally signed (using e.g., device private key 400), the signed download request may subsequently be verified 556 by media distribution system 18 using device public key 402.

Once e.g., download requests 520, 522, 524 are received 558 and processed 554, 556 by media distribution system 18, media distribution system 18 may retrieve the requested media data files 500, 504, 506 from e.g., storage device 34. As discussed above, each media data file is currently encrypted using a unique CEK, such that the CEK is bound to the media data file.

Prior to being downloaded to personal media device 12, each media data file to be downloaded may be bound 560 to the user (e.g., user 14) who requested the download. As discussed above, during device initialization, personal media device 12 provides license request 408 to media distribution system 18. Media distribution system 18 in turn processes license request 408 and obtains current subscription information concerning the user associated with license request 408 (e.g., user 14). As discussed above, this initialization process may occur periodically and, therefore, may occur at the time that personal media device 12 is placed into docking cradle 60 (FIG. 2). Accordingly and for this example, assume that personal media device 12 has provided the required user credentials to properly access media distribution system 18. As discussed above, the user credentials provided to media distribution system 18 may include, but are not limited to, a user name, a user password, a user key, a device name, a device password, a device key, and/or one or more digital certificates.

Once media distribution system 18 retrieves the requested media data files 500, 504, 506 from e.g., storage device 34, media distribution system 18 binds 560 the retrieved media data files 500, 504, 506 to user 14 e.g., the user requesting the media data files, thus creating bound media data files 526, 528, 530. Accordingly, the content encryption key (e.g., CEK 510) associated with each media data file (e.g., media data file 500) may be encrypted 562 using the encryption key (e.g., user encryption key 422) of the user requesting the media data files (e.g., user 14). Accordingly, CEK 510 may be encrypted 562 to generate CEK 510', CEK 514 may be encrypted 562 to generate CEK 514', and CEK 516 may be encrypted 562 to generate CEK 516'. Once encrypted 562, bound media data files 526, 528, 530 (including encrypted CEK's 510', 514', 516' respectively) may be provided 564 to personal media device 12.

As the CEK of each bound media data file 526, 528, 530 may be encrypted 562 using e.g., user encryption key 422, bound media data files 526, 528, 530 may only be processed (e.g., rendered) by a personal media device in possession of user encryption key 422. As discussed above, a copy of user encryption key 422 may be stored on non-volatile memory within personal media device 12. Once bound media data files 526, 528, 530 are received by personal media device 12, files 526, 528, 530 may be stored on e.g., storage device 66 within personal media device 12.

Subscription Media Content Playback:

As discussed above, user ID 410, user encryption key 422, and timeout indicator 420 may be saved for use when personal media device 12 renders media content downloaded from media distribution system 18.

Continuing with the above-stated example, if user 14 wishes to render one of bound media data files 526, 528, 530, user 14 may select the appropriate media data file via the controls (e.g., backward skip switch 78 (FIG. 3); forward skip switch 80 (FIG. 3); play/pause switch 82 (FIG. 3); menu switch 84 (FIG. 3); radio switch 86 (FIG. 3); and slider assembly 88 (FIG. 3), for example) and display panel 90 (FIG. 3) of personal media device 12. Once one or more media data files are selected for playback, the appropriate file(s) are retrieved from e.g., storage device 66. As discussed above, prior to each media data file being provided to personal media device 12, the CEK of each media data file may be encrypted (by media distribution system 18) using user encryption key 422. As discussed above, user encryption key 422 may be a symmetric encryption key and, therefore, the key used to e.g., encrypt CEK 510 may also be used to decrypt encrypted CEK 510'.

Once the appropriate bound media data files are retrieved from e.g., storage device 66, DRM process 10 may decrypt the appropriate CEK (using user encryption key 422) so that the media data file can be processed and rendered on personal media device 12. For example, if user 14 wished to render bound media data files 526, 528, personal media device 12 would decrypt encrypted CEK 510' to generate CEK 510. CEK 510 may then be used by DRM process 10 to decrypt media data file 500 for playback by personal media device 12. Further, DRM process 10 would decrypt encrypted CEK 514' to generate CEK 514. CEK 514 may then be used by DRM process 10 to decrypt media data file 504 for playback by personal media device 12.

Typically, prior to processing and rendering e.g., bound media data files 526, 528, DRM process 10 will verify that e.g., user 14 has sufficient rights to process and render the bound media data files.

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18.

Assuming that bound media data files 526, 528, 530 are subscription downloads (as opposed to purchased downloads that are licensed in perpetuity for use by user 14), prior to rendering and/or processing bound media data files 526, 528, 530, DRM process 10 may obtain timeout indicator 420, which as discussed above may be stored on e.g., non-volatile memory, examples of which include ROM 152 (FIG. 3) and/or storage device 66 (FIG. 3). DRM process 10 may then compare the expiration date (e.g., 31 Mar. 2005) defined within timeout indicator 420 to the date and/or time defined within system clock 194 to determine if e.g., user 14 is still allowed to render bound media data files 526, 528, 530. In this example, as user 14 has a valid subscription through 31 Mar. 2005 and the current date and time (as defined by system clock 194) is 17:53 GMT on 6 Mar. 2005, the subscription of user 14 (with respect to media distribution system 18) is valid and current. Accordingly, bound media data files 526, 528, 530 may be processed for playback.

The Digital Millennium Copyright Act:

The Digital Millennium Copyright Act of 1998 may limit the number of times that a particular song, artist, or group of artists may be rendered within a specified time interval. When rendering a sequence of tracks, the sequence may comply with the Digital Millennium Copyright Act if e.g., over a three-hour time interval: (i) no more than three tracks from the same album are rendered; (ii) no more than two consecutive tracks from the same album are rendered; (iii) no more than four tracks from the same artist (i.e., individual/group) or anthology are rendered; and (iv) no more than three consecutive tracks from the same artist (i.e., individual/group) or anthology are rendered.

Obtaining Radio Media Content:

As discussed above, the format of media content 16 received from media distribution system 18 may include: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example.

Personal media device 12/proxy computer 54, and client computer 44 may receive and process radio media content 124, 126 respectively. Radio media content 124, 126 may include of a plurality of tracks chosen from a specific music genre/time period and played in a sequence that is compliant with e.g., The Digital Millennium Copyright Act. Typically, when a user (e.g., user 14) wishes to receive and process radio media content (e.g., radio media content 124, 126), the user may select a radio station from a plurality of radio stations available to the user from media distribution system 18.

Figure 14:
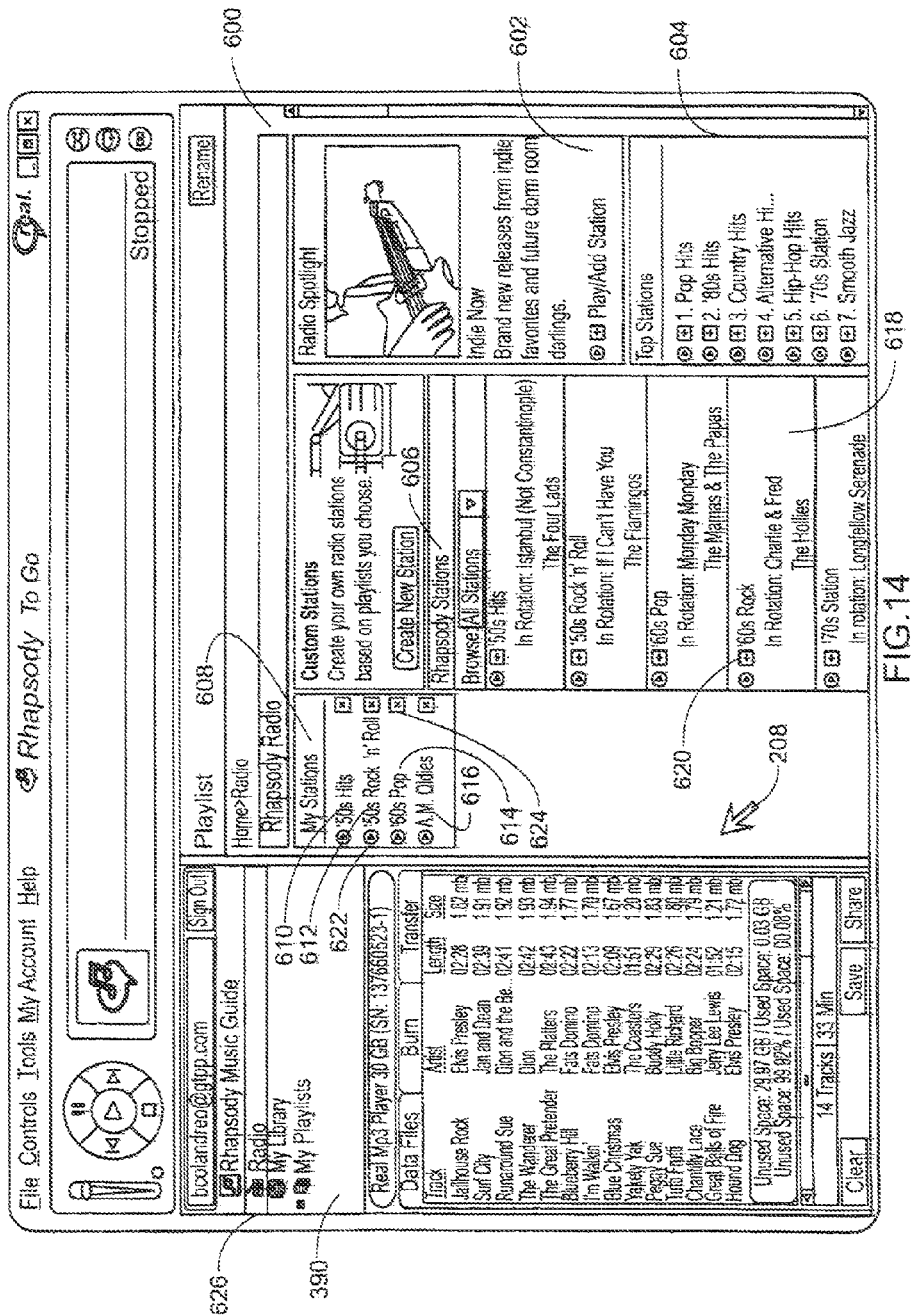
FIG. 14 is a display screen rendered by the proxy application of FIG. 1.

For example and referring also to FIG. 14, when using e.g., proxy application 98 to receive and process radio media content 124 from media distribution system 18, user 14 may be presented with a radio information screen 600 rendered by proxy application 98. Radio information screen 600 may include a radio spotlight screen 602 that provides information concerning a featured radio station. Additionally, radio information screen 600 may include a "Top Stations" screen 604 that defines the most popular radio stations offered by media distribution system 18. The "Top Stations" list may be defined based upon e.g., the total number of times that a radio station was accessed by users of media distribution system 18; the total duration of time that a radio station was accessed by users of media distribution system 18; and/or the total number of unique users of media distribution system 18 that accessed a radio station, for example.

Radio information screen 600 may additionally include an available station screen 606 that defines the radio stations that are available to users of media distribution system 18. Further, radio information screen 600 may include a "My Stations" screen 608 that itemizes one or more radio stations 610, 612, 614, 616 that a user (e.g., user 12) defined as their "favorite" radio stations. For example, if user 14 wished to add the radio station "60s Rock" 618 to their "My Stations" screen 608, user 14 may select (using screen pointer 208) the "add" button 620 adjacent the radio station "60s Rock" 618, resulting in the generation of a fifth entry (not shown) in "My Stations" screen 608 that defines radio station "60s Rock" 618. Additionally, when user 14 wishes to listen to a radio station, user 14 may select the play button (e.g., play button 622) associated with the radio station (e.g., "50s Rock 'n' Roll" 612) that they wish to listen to. Alternatively, when user 14 wishes to remove a radio station from "My Stations" screen 608, user 14 may select the "remove station" button 624 associated with the radio station (e.g., "50s Rock 'n' Roll" 612) that they wish to remove. User 14 may access radio information screen 600 by selecting the "radio" link 626 included within directory window 390 using e.g., screen pointer 208.

While radio content is discussed above as being playable via proxy application 98 and, therefore, proxy computer 54, other configurations are possible. For example, radio media content may also be playable via client application 46 and, therefore, client computer 44.

As discussed above, media content may be streamed from media distribution system 18 and, typically, in order for a device to receive and process a media data stream from e.g., computer 28, the device must have an active connection to computer 28 and, therefore, media distribution system 18. As proxy computer 54 and client computer 44 are actively connected to media distribution system 18, proxy computer 54 and client computer 44 may receive and process radio media content 124, 126 which is typically streamed from media distribution system 18.

As discussed above, radio media content is typically rendered in a sequence that is compliant with e.g., The Digital Millennium Copyright Act. As radio media content 124, 126 is typically streamed from computer 28 for playback on proxy computer 54 and/or client computer 44 (respectively), the rendering sequence of the individual tracks within radio media content 124, 126 is controllable by media distribution system 18 and, therefore, may be configured to be compliant with e.g., The Digital Millennium Copyright Act.

In addition to radio media content being streamed to devices (e.g., proxy computer 54 and client computer 44), radio media content may be cached for playback on devices that do not have an active connection to media distribution system 18, example of which include personal media devices 12, 40, 42.

When caching radio media content 124 for playback on e.g., personal media device 12, the individual tracks within radio media content 124 are typically retrieved from media distribution system 18 as subscription downloads. As discussed above, a subscription download is media content that is licensed to e.g., user 14 for use while a valid subscription exists with media distribution system 18. Further and as discussed above, when personal media device 12 is initialized, a device license 424 (FIG. 12*a*) is generated for personal media device 12. Device license 424 may include a timeout indicator 420 (FIG. 12*a*) that indicates e.g., the user's subscription information and the expiration date of the user's current subscription. Accordingly and as discussed above, prior to rendering and/or processing one or more of the subscription downloads included within radio media content 124, DRM process 10 (FIG. 1) of personal media device 12 may obtain timeout indicator 420 from device license 424 to determine if e.g., user 14 is still allowed to render the subscription downloads included within radio media content 124.

Typically, when radio media content 124 is provided to personal media device 12, a plurality of subscription downloads, meeting the requirements (e.g., genre and/or time period, for example) of the radio station, may be retrieved from media distribution system 18. The media content may be referred to as seed content. The exact number of subscription downloads retrieved may vary depending on governing laws and policies, examples of which include (but are not limited to) the Digital Millennium Copyright Act, the ASCAP (i.e., the American Society of Composers, Authors, and Publishers) policies, and the BMI (i.e., Broadcast Music, Inc.) policies. For example, while the minimum number of subscription downloads included within radio media content 124 may be defined as low as e.g., eighty, that number may be increased considerably (e.g., up to greater than five-hundred subscription downloads) depending on e.g., the storage capacity of the device (e.g., personal media device 12), the policy guidelines established by media distribution system 18, and/or the governing laws and policies (e.g., The Digital Millennium Copyright Act, ASCAP and BMI), for example.

Figure 15A:
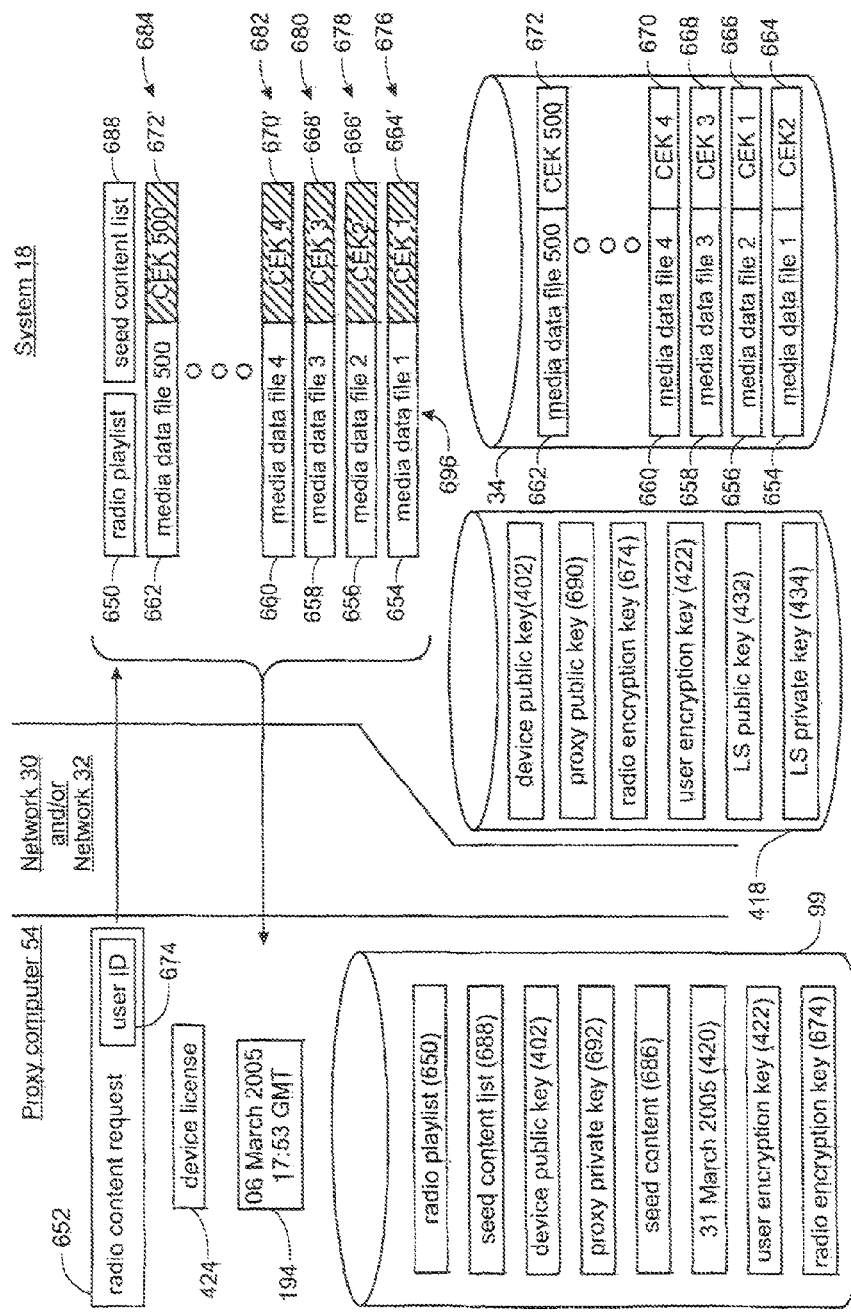
FIG. 15a is a diagrammatic view of the media distribution system, distributed computing network, and proxy computer of FIG. 1.
Figure 15B:
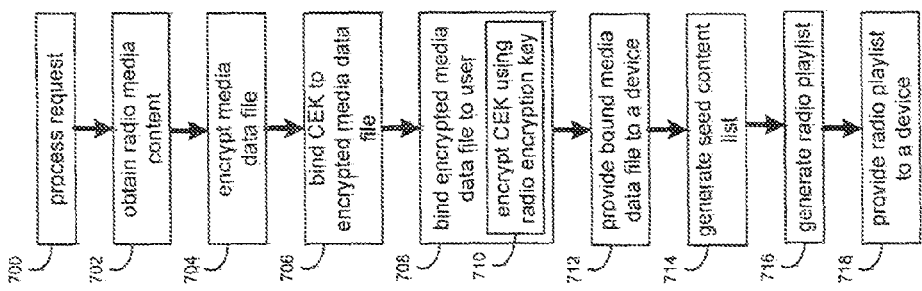
FIG. 15b is a flowchart of a process executed by the proxy application of FIG. 1.

As discussed above and referring also to FIGS. 15*a* & 15*b*, to adhere to e.g., The Digital Millennium Copyright Act, the individual subscription downloads (included within radio media content 124) need to be rendered in a specific sequence, which is controlled by a radio playlist 650.

Continuing with the above-stated example, assume that user 14 wishes to render radio media content 124 on personal media device 12. Specifically, assume that user 14 wishes to listen to the radio station "50s Rock 'n' Roll" 612 and, therefore, selects play button 622 using proxy application 98 running on proxy computer 54. Proxy computer 54 may provide a radio content request 652 to media distribution system 18. For security and authentication purposes, radio content request 652 may be e.g., encrypted and/or digitally signed (as discussed above) prior to being provided to media distribution system 18. Once radio content request 652 is received by media distribution system 18, media distribution system 18 may process 700 radio content request 652 and retrieve media content that meets the criteria of the selected radio station. For example, radio station "50s Rock 'n' Roll" 612 may include a music genre requirement (i.e., Rock 'n' Roll) and a time period requirement (i.e., the 50s).

In response to this request, media distribution system 18 may obtain 702 a defined number of subscription downloads that meets the requirements of the selected radio station. Assume for illustrative purposes that media distribution system 18 selects five-hundred tracks (i.e., subscription downloads) to be included in the seed content. Accordingly, five-hundred subscription downloads (e.g., media data files 654, 656, 658, 660, 662) may be retrieved from storage device 34. As discussed above, media distribution system 18 may encrypt 704 each of the media data files 654, 656, 658, 660, 662 using a unique CEK 664, 666, 668, 670, 672 respectively, each of which is bound 706 to the media data file to which the CEK is related. Accordingly and for example, CEK 664 may be bound to media data file 654, and CEK 666 may be bound to media data file 656, for example.

As discussed above, prior to a subscription download being provided to personal media device 12, each subscription download may be bound 708 to the user (e.g., user 14) who requested the media data file. This binding process may be accomplished by encrypting the CEK of the media data file using the user encryption key of the user requesting the subscription download.

Accordingly, prior to media data files 654, 656, 658, 660, 662 being provided to personal media device 12, the CEK of each media data file may be encrypted 710 using a radio encryption key 674 associated with the user (e.g., user 14)

who requested the radio media content. As the identity of user 14 may be known (via a user ID 674 included within radio content request 652), media distribution system 18 may obtain radio encryption key 674 (i.e., the radio encryption key for user 14) from data store 418.

Media distribution system 18 may bind 708 media data files 654, 656, 658, 660, 662 to user 14 (i.e., the user requesting the media data files), thus creating bound media data files 676, 678, 680, 682, 684 (i.e., collectively referred to as seed content 686). Accordingly, the content encryption key (e.g., CEK 664) associated with each media data file (e.g., media data file 654) may be encrypted 710 using radio encryption key 674 to form the encrypted content encryption key (e.g., encrypted CEK 664'). Further, CEK 666 may be encrypted 710 to generate encrypted CEK 666', CEK 668 may be encrypted 710 to generate encrypted CEK 668', CEK 670 may be encrypted 710 to generate encrypted CEK 670', and CEK 672 may be encrypted 710 to generate encrypted CEK 672'.

Once the CEKs are encrypted 710, bound media data files 676, 678, 680, 682, 684 (including encrypted CEK's 664', 666', 668', 670', 672' respectively) may be provided 712 to proxy computer 54. Additionally, seed content list 688 may be generated 714 and provided to proxy computer 54, which identifies the individual subscription downloads (e.g., bound media data files 676, 678, 680, 682, 684) included within seed content 686.

Further, radio encryption key 674 (which is required to decrypt encrypted CEKs 664', 666', 668', 670', 672') may be provided to proxy computer 54. Typically, prior to providing radio encryption key 674 to proxy computer 54, radio encryption key 674 may be encrypted using proxy public key 690 (which may be stored on data store 418 of media distribution system 18). Once received by proxy computer 54, radio encryption key 674 may be decrypted using proxy private key 692 (which may be stored on storage device 99 of proxy computer 54). Alternatively, prior to providing radio encryption key 674 to proxy computer 54, radio encryption key 674 may be encrypted using device public key 402 (which may be stored on data store 418 of media distribution system 18). Once received by proxy computer 54, the encrypted radio encryption key 674 may be provide to personal media device 12, for decryption using device private key 400 (FIG. 12a).

As discussed above, radio playlist 650 may define a rendering sequence for all or a portion of the subscription downloads included within seed content 686. Continuing with the above-stated example, radio playlist 650 may provide a unique rendering sequence for the five-hundred subscription downloads included within seed content 686. Alternatively, radio playlist 650 may provide a unique rendering sequence for only a portion of the subscription downloads included within seed content 686. For example, a unique rendering sequence may be defined for the first three-hundred (of the available five-hundred) subscription downloads included within seed content 686, with the remaining two-hundred subscription downloads being held in reserve. Therefore, in the event that a user decides to skip a song while rendering the playlist, one of the songs held in reserve may be used to replace the song skipped (provided that the "revised" rendering sequence adheres to e.g., The Digital Millennium Copyright Act.

While radio playlist 650 is described as being generated 716 by media distribution system 18 and provided 718 to proxy computer 54, other configurations are possible. For example, radio playlist 650 may be e.g., generated 716 by proxy computer 54 and provided 718 to personal media device 12; or generated 716 by personal media device 12. Additionally, while radio playlist 650 is described above as being a single radio playlist, other configurations are possible. For example, media distribution system 18 may generate and provide (to e.g., proxy computer 54) multiple radio playlists.

Figure 16A:
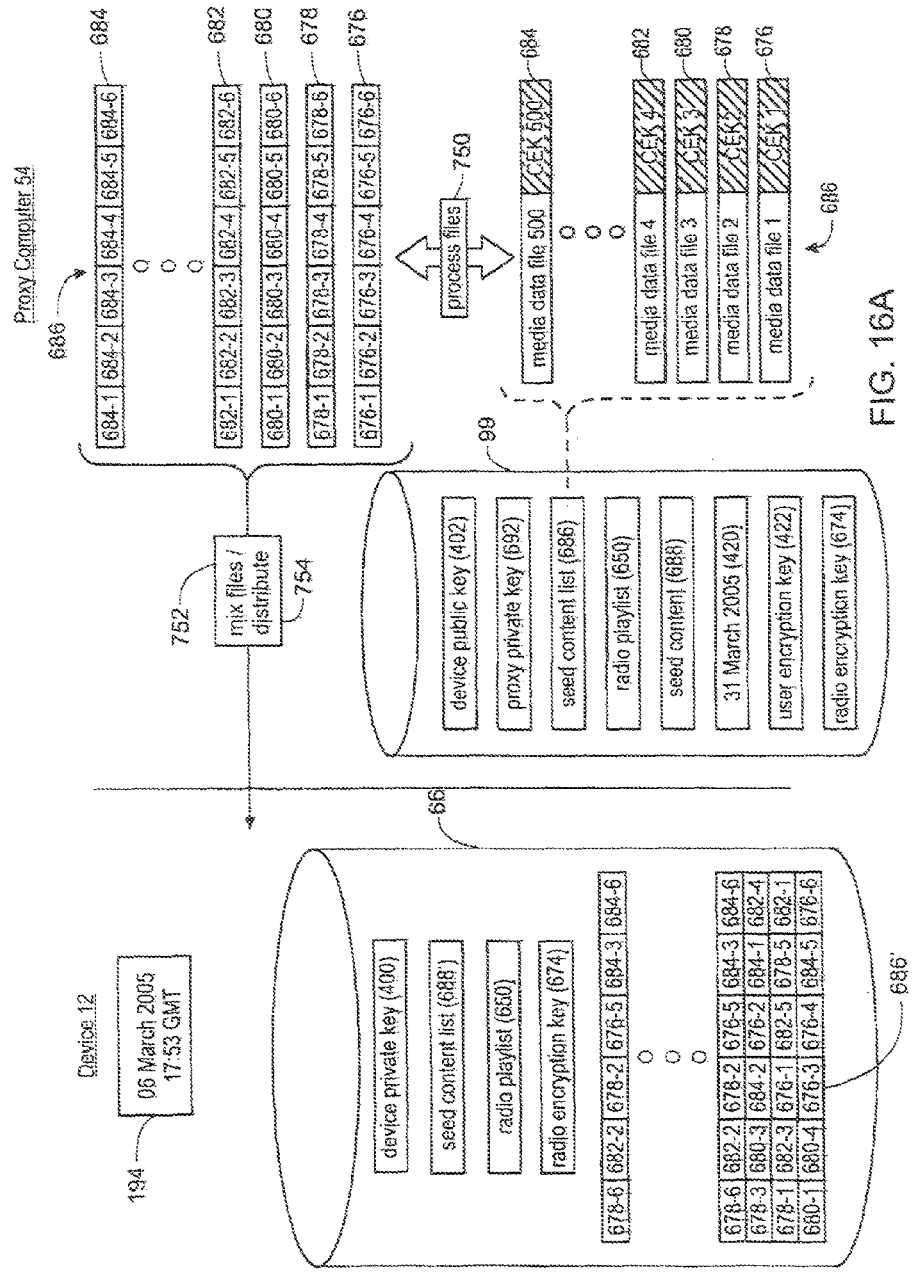
FIG. 16a is a diagrammatic view of the proxy computer and personal media device (including a storage device, radio playlist and modified seed content list) of FIG. 1.
Figure 16B:
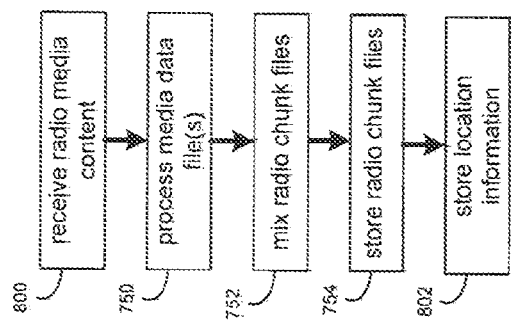
FIG. 16b is a flowchart of a process executed by the proxy application of FIG. 1.

Referring also to FIGS. 16a & 16b, once received 800 by proxy computer 54, radio playlist 650, radio encryption key 674, seed content 686 and seed content list 688 may be stored on e.g., storage device 99 of proxy computer 54.

As discussed above, radio encryption key 674 may be encrypted (by media distribution system 18) using device public key 402 (i.e., the public key of personal media device 12). If so, encrypted radio encryption key 674 may be provided to personal media device 12 for decryption using device private key 400. Alternatively and as discussed above, radio encryption key 674 may be encrypted using proxy public key 690. If so, encrypted radio encryption key 674 may be decrypted using proxy private key 692 and subsequently encrypted using device public key 402 prior to being provided to personal media device 12 (for decryption using device private key 400).

As seed content 686 may be considerably large, the process of receiving 800 seed content 686 from media distribution system 18 may be configured to operate in the background, thus allowing proxy computer 54 to be used for other tasks while seed content 686 is being downloaded from media distribution system 18. Additionally and for similar reasons, personal media device 12 need not be coupled to proxy computer 54 during the download process, thus allowing user 14 to uncouple (from proxy computer 54) and operate personal media device 12 while seed content 686 is being downloaded from media distribution system 18.

Once seed content 686 is received 800 by proxy computer 54, seed content 686 may be processed 750 prior to being provided to personal media device 12. For example, each bound media data file 676, 678, 680, 682, 684 may be divided 750 into a plurality of radio chunk files. For example, bound media data file 676 may be divided 750 into six radio chunk files, namely radio chunk files 676-1, 676-2, 676-3, 676-4, 676-5, 676-6. Typically, with the exception of the last radio chunk file (i.e., radio chunk file 676-6), the radio chunk files may all be equal in length. For example, assuming that bound media data file 676 is 5.28 megabytes in size, the corresponding radio chunk files 676-1, 676-2, 676-3, 676-4, 676-5 may each be 1.00 megabytes in size, with radio chunk file 676-6 being 0.28 megabytes in size. Alternatively, bound media data file 676 may be divided 750 into six equally-sized radio chunk files (i.e., each having a size of 0.88 megabytes).

In addition to bound media data files being divided 750 into radio chunk files, the resulting radio chunk files may be mixed 752 together to enhance the security of bound media data files 676, 678, 680, 682, 684. For example, assume that bound media data file 676 is divided 750 in six radio chunk files 676-1, 676-2, 676-3, 676-4, 676-5, 676-6, such that radio chunk files 676-1, 676-2, 676-3, 676-4 are each 1.00 megabyte in size and radio chunk files 676-5, 676-6 are 0.64 megabytes in size. Equally-sized radio chunk files 676-1, 676-2 may be mixed 752 together; equally-sized radio chunk files 676-3, 676-4 may be mixed 752 together; and equally-sized radio chunk files 676-5, 676-6 may be mixed 752 together.

For illustrative purposes, when mixing 752 the radio chunk files (e.g., radio chunk files 676-1, 676-2, 676-3, 676-4, 676-5, 676-6) of a bound media data file (e.g., media data file 676), one or more processes may be executed. For example, the odd words of radio chunk file 676-1 may be replaced with the odd words of radio chunk file 676-2, and the odd words of radio chunk file 676-2 may be replaced with the odd words of radio chunk file 676-1 (resulting in a swapping of odd words between radio chunk files 676-1, 676-2). Additionally, the odd words of radio chunk file 676-3 may be replaced with the odd words of radio chunk file 676-4, and the odd words of radio chunk file 676-4 may be replaced with the odd words of radio chunk file 676-3 (resulting in a swapping of odd words between radio chunk files 676-3, 676-4). Further, the odd words of radio chunk file 676-5 may be replaced with the odd words of radio chunk file 676-6, and the odd words of radio chunk file 676-6 may be replaced with the odd words of radio chunk file 676-5 (resulting in a swapping of odd words between radio chunk files 676-5, 676-6).

In addition to the mixing process described above, other methodologies may be employed. For example, the individual data chunk files may be XOR'd with radio encryption key 674.

Once bound media data files 676, 678, 680, 682, 684 are processed 750 and mixed 752, prior to being provided to personal media device 12, the various radio chunk files are distributed and stored 754 so that e.g., the radio chunk files are not sequentially order. For example, prior to distribution, radio chunk file 676-1 may be followed (in memory) by radio chunk file 676-2, which may be followed (in memory) by radio chunk file 676-3, which may be followed (in memory) by radio chunk file 676-4, which may be followed (in memory) by radio chunk file 676-5, which may be followed (in memory) by radio chunk file (676-6). Accordingly, prior to being transferred to personal media device 12, the various radio chunk files may be distributed and stored 752 to form modified seed content 686', which may be in a less sequential order than seed content 686.

Figure 17A:
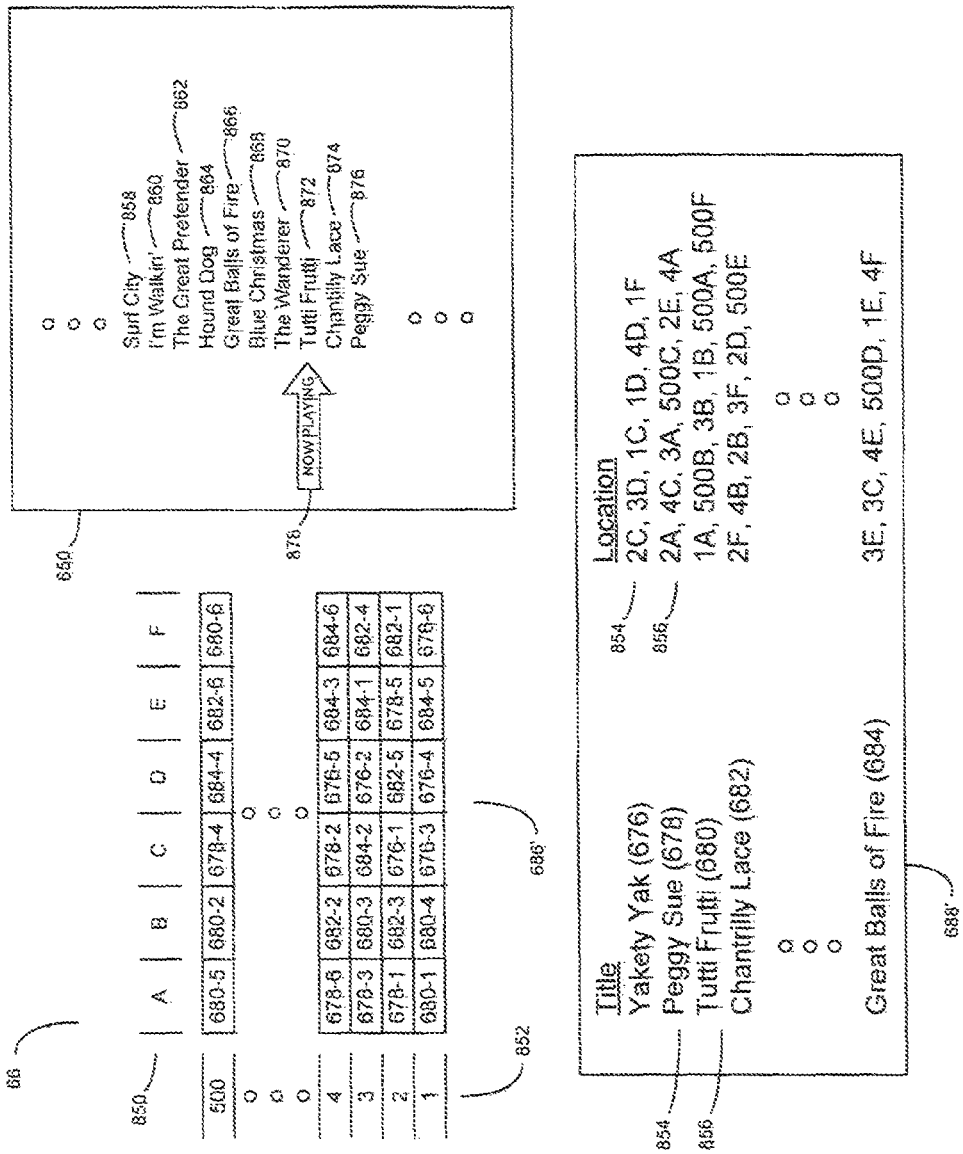
Figure 17B:
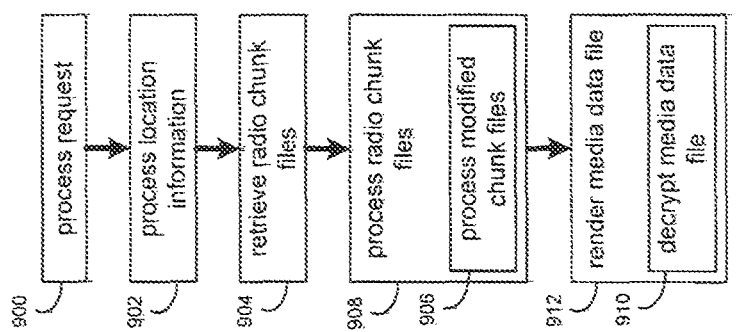
FIG. 17b is a flowchart of a process executed by the device application of FIG. 1.

When distributing and storing 754 the radio chunk files, the radio chunk files may be distributed and stored 754 in a random fashion or algorithmically. Referring also to FIGS. 17a & 17b, modified seed content 686' is shown located within storage device 66, such that (for illustrative purposes) the individual memory locations within storage device 66 are divided into columns 850 (e.g., columns A-F) and rows 852 (Rows 1-500). As shown, the memory locations within Row 1 of storage device 66 include radio chunk files 680-1, 680-4, 676-3, 676-4, 684-5, 676-6. Accordingly, radio chunk files 680-1, 680-4, 676-3, 676-4, 684-5, 676-6 are not sequentially ordered.

As discussed above, the positioning of the individual radio chunk files within the 3,000 available memory locations (e.g., 6 Columns×500 Rows) may be accomplished randomly. For example, the memory location of radio chunk file 676-1 may be randomly selected from the 3,000 available locations. Assuming that location 2C is chosen, the location of radio chunk file 676-2 may be randomly selected from the remaining 2,999 memory locations (i.e., all memory locations except location 2C). Assuming that location 3D is chosen, the location of radio chunk file 676-3 may be randomly selected from the remaining 2,998 memory locations (i.e., all memory locations except locations 2C & 3D). This process may be continued until all radio chunk files are located within storage device 66.

While this distribution and storage 754 of radio chunk files is described above as being performed by proxy computer 54 prior to transferring modified seed content 686' to personal media device 12, other configurations are possible. For example, seed content 686 may be transferred to personal media device 12 in its original (i.e., unmodified) form, such that seed content 686 is subsequently modified by personal media device 12 to generate modified seed content 686'.

Seed content list 688 may be appended and stored 802 to include location information concerning the various radio chunk files of a bound media data file, thus forming modified seed content list 688'. As discussed above and continuing with the above stated example, bound media data file 676 may have been divided 750 into six radio chunk files, namely radio chunk file 676-1, 676-2, 676-3, 676-4, 676-5, 676-6. Additionally and as discussed above, these radio chunk files may have been mixed 752 together. Accordingly, in order to render bound media data file 676 (to be discussed below in greater detail), the location of the individual radio chunk files (i.e., radio chunk file 676-1, 676-2, 676-3, 676-4, 676-5, 676-6) that constitute bound media data file 676 may be defined within appended seed content list 688', which is provided to personal media device 12.

As discussed above, seed content list 688 may identify the individual subscription downloads (e.g., bound media data files 676, 678, 680, 682, 684) included within seed content 686. Therefore, seed content list 688 may include e.g., an entry 854 that defines "Yakety Yak" (i.e., bound media data file 676) and an entry 856 that defines "Peggy Sue" (i.e., bound media data file 678).

Accordingly, entry 854 (within modified seed content list 688') for "Yakety Yak" (i.e., bound media data file 676) may be modified to include 2C, 3D, 1C, 1D, 4D, 1F (i.e., the memory locations of radio chunk files 676-1, 676-2, 676-3, 676-4, 676-5, 676-6, respectively); and entry 856 (within modified seed content list 688') for "Peggy Sue" (i.e., bound media data file 678) may be modified to include 2A, 4C, 3A, 500C, 2E, 4A (i.e., the memory locations of radio chunk files 678-1, 678-2, 678-3, 678-4, 678-5, 678-6, respectively), for example.

Alternatively, instead of (or in addition to) appending and storing 802 seed content list 688 (to generate modified seed content list 688'), radio playlist 650 may be appended to include the above-described memory locations, thus defining a modified radio playlist (not shown). Further, a mapping file (not shown) may be generated to define the above-described memory locations. Additionally and as discussed above, the various radio chunk files of a bound media data file may be located algorithmically within storage device 66. Accordingly, a memory location algorithm (as opposed to modified seed content list 688') may be used to define the above-described memory locations.

As discussed above, seed content 686 may be transferred to personal media device 12 in its original (i.e., unmodified) form, such that seed content 686 is subsequently modified by personal media device 12 to generate modified seed content 686'. If so, modified seed content list 688' may be generated by personal media device 12.

Radio Media Content Playback:

Once the various radio chunk files that constitute bound media data files 676, 678, 680, 682, 684 are provided to personal media device 12, bound media data files 676, 678, 680, 682, 684 (which, for illustrative purposes, represents 500 subscriptions downloads included within radio media content 124) may be rendered by personal media device 12.

Continuing with the above-stated example, if user 14 wishes to render radio media content 124, user 14 may select radio switch 86 (FIG. 3), resulting in device application 64 (FIG. 1) rendering a list of "available" radio stations on display panel 90 (FIG. 3). Typically, a radio station will only be listed as "available" if radio media content 124 for the radio station was previously retrieved from media distribution system 18. As radio media content 124 was retrieved for radio station "50s Rock 'n' Roll" 612 (FIG. 14), user 14 may select radio station "50s Rock 'n' Roll" 612 using e.g. slider assembly 88 (FIG. 3) and may request 900 playback using e.g., play/pause switch 82 (FIG. 3).

Once the appropriate radio station is selected, DRM process 10 (FIG. 1) retrieves the appropriate file(s) from e.g., storage device 66. For example, radio playlist 650 and modified seed content list 688' may be retrieved by DRM process 10. Typically, when rendering radio media content 124, radio playlist 650 is sequentially processed, such that the individual tracks listed within radio playlist 650 are sequentially rendered. For example and as shown in playlist 650, "Surf City" 858 may be played, flowed by "I'm Walkin" 860, followed by "The Great Pretender" 862, followed by "Hound Dog" 864, followed by "Great Balls of Fire" 866, followed by "Blue Christmas" 868, followed by "The Wanderer" 870, followed by "Tutti Frutti" 872, followed by "Chantilly Lace" 874, followed by "Peggy Sue" 876, and so on.

As discussed above, the individual radio chunk files that make up a bound media data file may be distributed on e.g., storage device 66. Accordingly, modified seed content list 688' may be processed 902 by DRM process 10 to locate the relevant radio chunk files within storage device 66. For example, assume that personal media device 12 just finished rendering "The Wanderer" 870. Pointer 878 may be incremented to point to "Tutti Frutti" 872, which corresponds to bound media data file 680. DRM process 10 may process 902 modified seed content list 688' to determine the locations of radio chunk files 680-1, 680-2, 680-3, 680-4, 680-5, 680-6 (i.e., the six radio chunk files that constitute bound media data file 680). Accordingly, upon DRM process 10 processing 902 modified seed content list 688', the locations of radio chunk files 680-1, 680-2, 680-3, 680-4, 680-5, 680-6 are determined to be 1A, 500B, 3B, 1B, 500A, 500F, respectively. Accordingly, radio chunk files 680-1, 680-2, 680-3, 680-4, 680-5, 680-6 may be retrieved 904 from memory locations 1A, 500B, 3B, 1B, 500A, 500F (respectively) within e.g., storage device 66.

As discussed above, prior to being distributed 754, radio chunk files 680-1, 680-2, 680-3, 680-4, 680-5, 680-6 may have been mixed 752 together to enhance data security. As discussed above, the odd words of a first radio chunk file may be replaced with the odd words of second radio chunk file, and the odd words of the second radio chunk file may be replaced with the odd words of a first radio chunk file (resulting in a swapping of odd words between the first and second radio chunk files). Accordingly, radio chunk files 680-1, 680-2, 680-3, 680-4, 680-5, 680-6 may be processed 906 by DRM process 10 in a fashion that nullifies the original mixing procedure 752. For example, radio chunk files 680-1, 680-2, 680-3, 680-4, 680-5, 680-6 may be returned to their original form by swapping odd words between pairs of radio chunk files, in turn nullifying the original odd word swapping procedure.

Once radio chunk files 680-1, 680-2, 680-3, 680-4, 680-5, 680-6 are processed 906 to return them to their original form, radio chunk files 680-1, 680-2, 680-3, 680-4, 680-5, 680-6 are processed 908 by DRM process 10 to form bound media data file 680 (i.e., the bound media data file from which radio chunk files 680-1, 680-2, 680-3, 680-4, 680-5, 680-6 were generated).

As discussed above, prior to each media data file being provided to personal media device 12, the CEK of each media data file may have been encrypted (by media distribution system 18) using radio encryption key 674. In a fashion similar to user encryption key 422, radio encryption key 674 may be a symmetric encryption key and, therefore, the key used to e.g., encrypt CEK 664 may also be used to decrypt encrypted CEK 664'.

When radio encryption key 674 is provided to personal media device 12 (from either media distribution system 18 or proxy computer 54), radio encryption key 674 may have been encrypted using device public key 402. Accordingly, radio encryption key 674 may be decrypted using device private key 400.

Once e.g., bound media data file 680 is formed from e.g., radio chunk files 680-1, 680-2, 680-3, 680-4, 680-5, 680-6, DRM process 10 may decrypt 910 the appropriate CEK (using radio encryption key 674) so that the media data files can be processed and rendered 912 on personal media device 12. Continuing with the above-stated example, when playlist 650 indicates (via incrementing pointer 878) that e.g., "Tutti Frutti" 872 is to be rendered 912, DRM process 10 locates 902 radio chunk files 680-1, 680-2, 680-3, 680-4, 680-5, 680-6 within storage device 66 using modified seed content list 688' (or a memory location algorithm, described above). Once located 902, radio chunk files 680-1, 680-2, 680-3, 680-4, 680-5, 680-6 are retrieved 904 from storage device 66, processed 906 to return radio chunk files 680-1, 680-2, 680-3, 680-4, 680-5, 680-6 to their original form, and processed 908 to form bound media data file 680 (i.e., the bound media data file corresponding to "Tutti Frutti" 872), which includes encrypted CEK 668' and media data file 658.

DRM process 10 may decrypt 910 (using radio encryption key 674) encrypted CEK 668' to generate CEK 668 (i.e., the CEK bound to media data file 658). CEK 668 may then be used by DRM process 10 to decrypt 910 media data file 658 for playback by personal media device 12. This process may be repeated for each track specified in radio playlist 650.

Typically, prior to processing and rendering e.g., bound media data file 676, DRM process 10 will verify that e.g., user 14 has sufficient rights to process and render the bound media data files.

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18.

As radio media content 124 includes bound media data files 676, 678, 680, 682, 684 and (as discussed above) bound media data files 676, 678, 680, 682, 684 are subscription downloads, prior to rendering and/or processing bound media data files 676, 678, 680, 682, 684, DRM process 10 may obtain timeout indicator 420 and compare the expiration date (e.g., 31 Mar. 2005) defined within timeout indicator 420 to the date and/or time defined within system clock 194 to determine if e.g., user 14 is still allowed to render bound media data files 676, 678, 680, 682, 684. In this example, as user 14 has a valid subscription through 31 Mar. 2005 and the current date and time (as defined by system clock 194) is 17:53 GMT on 6 Mar. 2005, the subscription of user 14 (with respect to media distribution system 18) is valid and current. Accordingly, bound media data files 676, 678, 680, 682, 684 (i.e., radio media content 124) may be processed for playback.

User encryption key 422 and radio encryption key 674 are described above as typically being a symmetric encryption key, in that the same key that may be used to encrypt a CEK may also be used to decrypt the encrypted version of the CEK. Further and as described above, the same user encryption key 422 and radio encryption key 674 may be used to encrypt all CEK's. Therefore, if five-hundred bound media data files are downloaded to and stored upon personal media device 12, the same user encryption key 422 and radio encryption key 674 may be used to decrypt each of the five-hundred encrypted CEKs. However, other configurations of user encryption key 422 and radio encryption key 674 are possible.

Figure 18:
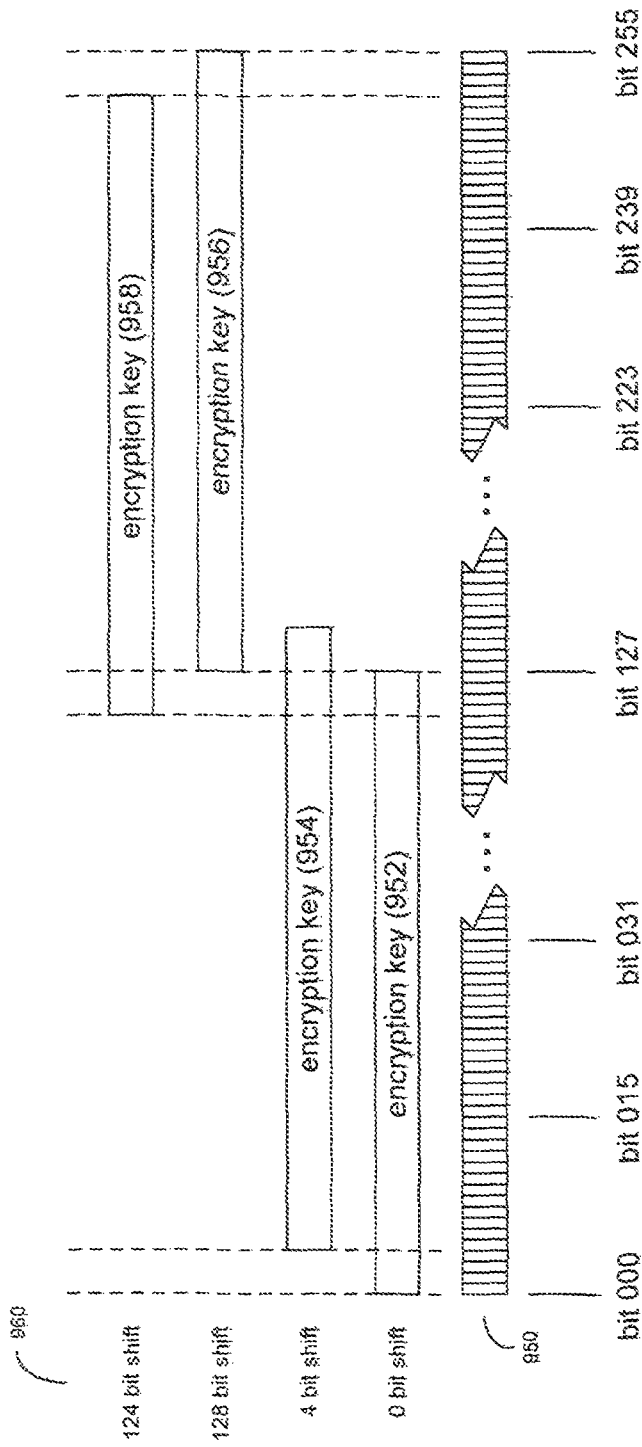
FIG. 18 is a diagrammatic view of an asymmetric key block.

For example, user encryption key 422 and radio encryption key 674 may be symmetric key blocks, as opposed to a single symmetric key. Referring also to FIG. 18, there is shown a 32-byte (i.e., 256-bit) symmetric key block 950. Assume for this example that a 16-byte (i.e., 128-bit) key is used to encrypt and decrypt each encrypted CEK. Through the use of one e.g., 256-bit symmetric key block 950, multiple 128-bit symmetric keys (e.g., encryption keys 952, 954, 956, 958 may be defined. For example, a first encryption key 952 may be defined as bits 000-127 of symmetric key block 950. A second encryption key 954 may be defined as bits 004-131 of symmetric key block 950. A third encryption key 956 may be defined as bits 128-255 of symmetric key block 950. And a fourth encryption key 958 may be defined as bits 124-251 of symmetric key block 950. Accordingly, a plurality of unique symmetric encryption keys may be defined using a single symmetric key block 950. Therefore, to properly define the individual encryption keys, in this particular example, a bit shift parameter 960 may be defined for each encryption key 952, 954, 956, 958, which defines the starting point of the respective key. For example, encryption key 952 starts at bit-0 of symmetric key block 950 and, therefore, has a bit shift 960 of 0-bits. As encryption key 954 starts at bit-4 of symmetric key block 950, encryption key 954 has a bit shift 960 of 4-bits. As encryption key 956 starts at bit-128 of symmetric key block 950, encryption key 956 has a bit shift 960 of 128-bits. As encryption key 958 starts at bit-124 of symmetric key block 950, encryption key 958 has a bit shift 960 of 124-bits.

While various encryption keys are defined within symmetric key block 950 by shifting the starting point of each individual encryption key, other configurations are possible. For example, keys may be defined using only odd or even bits in conjunction with a bit shift. Additionally and/or alternatively, keys may be defined within symmetric key block 950 algorithmically, in that an algorithm may be used to define the individual bits used (within symmetric key block 950) to define a unique encryption key. Additionally, a single symmetric key block 950 may be used to define both user encryption key 422 and radio encryption key 674.

A number of implementations have been described. Nevertheless, it will be understood that various modifications may be made. Accordingly, other implementations are within the scope of the following claims.

What is claimed is:

1. An apparatus for use in association with an Internet network and a remote electronic device, the apparatus comprising:
    one or more servers configured to provide via the Internet network at least one service, in response to at least one request, the at least one service comprising providing streaming media content;
    the streaming media content including a plurality of songs belonging to at least one genre corresponding to at least one selected station;
    the at least one selected station being selected from a plurality of stations that correspond, at least in part, to genres; and
    the one or more servers providing, in response to at least one other request, other media content for delivery via the Internet network, the other media content having been selected for purchase based upon results of a search query issued to the one or more servers;
    wherein:
        the streaming media content is provided via wireless communication to a cellular telephone;
        the one or more servers are configured to permit playback of at least one other song of the plurality of songs to be skipped in response to user request;
        Digital Rights Management (DRM) policy is enforced with respect to downloadable media content, the downloadable media content is downloaded, at least in part, from the one or more servers for storing, at least in part, in storage of the remote electronic device, the DRM policy permitting playing of the downloadable media content by the remote electronic device while a subscription associated with the remote electronic device exists;
        the remote electronic device comprises a wireless interface and antenna for use in the wireless communication;
        when the remote electronic device is in operation, the remote electronic device comprises a user interface that is configured to:
            receive at least one user input that requests that the remote electronic device display, at least in part, at least one radio station listing;
            receive at least one user selection for playing at the remote electronic device of at least one selected radio station from the listing;
        when the remote electronic device is in the operation, the remote electronic device is configured to store radio station stream media content of the at least one selected radio station, received from the one or more servers, for playing at the remote electronic device when connection with the one or more servers via the Internet is absent;
        the one or more servers receive configuration-related information generated via an application executed by a remote computer, the configuration-related information being provided, via the wireless communication, from the one or more servers to a device application executed by the remote electronic device, the configuration-related information being used in remotely configuring, at least in part, the remote electronic device for use with the one or more servers.

2. The apparatus of claim 1, wherein:
    the streaming media content and the other media content are to be provided to the device; and
    the device includes:
        another interface to permit the device to be coupled to a Universal Serial Bus of another computer, the another computer communicates with the one or more servers via the Internet;
        internal speakers; and
        a display to display a title and artist associated with the other media content.

3. The apparatus of claim 1, wherein:
    the streaming media content includes radio media content;
    the other media content includes a movie; and as received from the one or more servers, the other media content is encrypted based upon a Digital Rights Management process.

4. The apparatus of claim 1, wherein:
at least one selected station corresponds to a custom station based upon a user-selected playlist;
the user-selected playlist is selected at another computer remote from the one or more servers; and
the one or more servers are to maintain a history of media downloaded and streamed to the another computer.

5. The apparatus of claim 1, wherein:
the streaming media content and the other media content are provided to another computer; and
the another computer is to display a station list entitled "My Stations" that includes at least one user selected station.

6. The apparatus of claim 1, wherein:
the delivery comprises at least one of the following:
subscription download of the other media content;
downloading the other media content for storage;
provision to the remote electronic device; and/or
purchase download of the other media content.

7. One or more non-transitory storage media storing program instructions that, when executed, by a machine result in performance of operations comprising:
providing, by one or more servers, via an Internet network, in response to at least one request, at least one service, the at least one service comprising providing streaming media content;
the streaming media content including a plurality of songs belonging to at least one genre corresponding to at least one selected station;
the at least one selected station being selected from a plurality of stations that correspond, at least in part, to genres; and
providing, by the one or more servers, in response to at least one other request, other media content for delivery via the Internet network, the other media content having been selected for purchase based upon results of a search query issued to the one or more servers;
wherein:
the streaming media content is provided via wireless communication to a cellular telephone;
the one or more servers permit playback of at least one other song of the plurality of songs to be skipped in response to user request;
Digital Rights Management (DRM) policy is to be enforced with respect to downloadable media content, the downloadable media content is downloaded, at least in part, from the one or more servers for storing, at least in part, in storage of a remote electronic device, the DRM policy permitting playing of the downloadable media content by the remote electronic device while a subscription associated with the remote electronic device exists;
the remote electronic device comprises a wireless interface and antenna for use in the wireless communication;
when the remote electronic device is in operation, the remote electronic device comprises a user interface that is configured to:
receive at least one user input that requests that the remote electronic device display, at least in part, at least one radio station listing;
receive at least one user selection for playing at the remote electronic device of at least one selected radio station from the listing;
when the remote electronic device is in the operation, the remote electronic device is configured to store radio station stream media content of the at least one selected radio station, received from the one or more servers, for playing at the remote electronic device when connection with the one or more servers via the Internet is absent;
the one or more servers receive configuration-related information generated via an application executed by a remote computer, the configuration-related information being provided, via the wireless communication, from the one or more servers to a device application to be executed by the remote electronic device, the configuration-related information being used in remotely configuring, at least in part, the remote electronic device for use with the one or more servers.

8. The one or more non-transitory storage media of claim 7, wherein:
the streaming media content and the other media content are to be provided to the device; and
the device includes:
another interface to permit the device to be coupled to a Universal Serial Bus of another computer, the another computer communicates with the one or more servers via the Internet;
internal speakers; and
a display to display a title and artist associated with the other media content.

9. The one or more non-transitory storage media of claim 7, wherein:
the streaming media content includes radio media content;
the other media content includes a movie; and
as received from the one or more servers, the other media content is encrypted based upon a Digital Rights Management process.

10. The one or more non-transitory storage media of claim 7, wherein:
at least one selected station corresponds to a custom station based upon a user-selected playlist;
the user-selected playlist is selected at another computer remote from the one or more servers; and
the one or more servers are to maintain a history of media downloaded and streamed to the another computer.

11. The one or more non-transitory storage media of claim 7, wherein:
the streaming media content and the other media content are provided to another computer; and
the another computer is to display a station list entitled "My Stations" that includes at least one user selected station.

12. The one or more non-transitory storage media of claim 7, wherein:
the delivery comprises at least one of the following:
subscription download of the other media content;
downloading the other media content for storage;
provision to the remote electronic device; and/or
purchase download of the other media content.

* * * * *